(12) United States Patent
Nakagami et al.

(10) Patent No.: US 8,213,505 B2
(45) Date of Patent: Jul. 3, 2012

(54) ENCODING APPARATUS, ENCODING METHOD, PROGRAM FOR ENCODING METHOD, AND RECORDING MEDIUM HAVING PROGRAM FOR ENCODING METHOD RECORDED THEREON

(75) Inventors: Ohji Nakagami, Tokyo (JP); Kazushi Sato, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1026 days.

(21) Appl. No.: 12/171,882

(22) Filed: Jul. 11, 2008

(65) Prior Publication Data

US 2009/0097556 A1      Apr. 16, 2009

(30) Foreign Application Priority Data

Jul. 13, 2007    (JP) .............................. P2007-184286

(51) Int. Cl.
*H04N 7/18*    (2006.01)
(52) U.S. Cl. ................................. 375/240.12
(58) Field of Classification Search .................. None
See application file for complete search history.

(56) References Cited

U.S. PATENT DOCUMENTS

| 6,519,005 B2 * | 2/2003 | Bakhmutsky et al. ..... 348/415.1 |
| 7,450,640 B2 * | 11/2008 | Kim et al. ................ 375/240.12 |
| 2008/0002769 A1 * | 1/2008 | Matsui ..................... 375/240.13 |
| 2008/0240254 A1 * | 10/2008 | Au et al. .................. 375/240.24 |

FOREIGN PATENT DOCUMENTS

| JP | 2005-151017 | 6/2005 |
| JP | 2007-150728 | 6/2007 |

* cited by examiner

*Primary Examiner* — Chirag Shah
*Assistant Examiner* — Amar Persaud
(74) *Attorney, Agent, or Firm* — Finnegan, Henderson, Farabow, Garrett & Dunner, L.L.P.

(57) ABSTRACT

An encoding apparatus for generating, in an intra prediction mode, difference data by subtracting prediction values from input image data, and performing encoding processing on the input image data by processing the difference data. The apparatus includes a first prediction mode detecting section for detecting a first best prediction mode, a second prediction mode detecting section for detecting a second best prediction mode, and a prediction value generating section for selecting a best prediction mode. The first prediction mode detecting section detects the first best prediction mode by utilizing processing in the second prediction mode detecting section.

16 Claims, 12 Drawing Sheets

FIG. 9

|   | M | A | B | C | D | E | F | G | H |
|---|---|---|---|---|---|---|---|---|---|
| I |   | a | b | c | d |   |   |   |   |
| J |   | e | f | g | h |   |   |   |   |
| K |   | i | j | k | l |   |   |   |   |
| L |   | m | n | o | p |   |   |   |   |

FIG. 10

| Intra4×4LumaPredMode [4×4LumaBlkIdx] | Name of Intra4×4LumaPredMode [4×4LumaBlkIdx] |
|---|---|
| 0 | Intra_4×4_Vertical (prediction mode) |
| 1 | Intra_4×4_Horizontal (prediction mode) |
| 2 | Intra_4×4_DC (prediction mode) |
| 3 | Intra_4×4_Diagonal_Down_Left (prediction mode) |
| 4 | Intra_4×4_Diagonal_Down_Right (prediction mode) |
| 5 | Intra_4×4_Vertical_Right (prediction mode) |
| 6 | Intra_4×4_Horizontal_Down (prediction mode) |
| 7 | Intra_4×4_Vertical_Left (prediction mode) |
| 8 | Intra_4×4_Horizontal_Up (prediction mode) |

FIG. 13
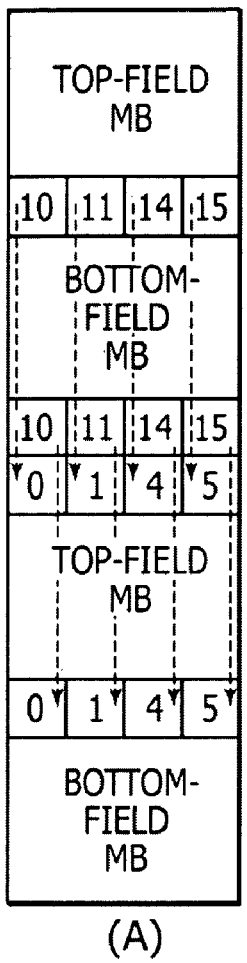
(A)
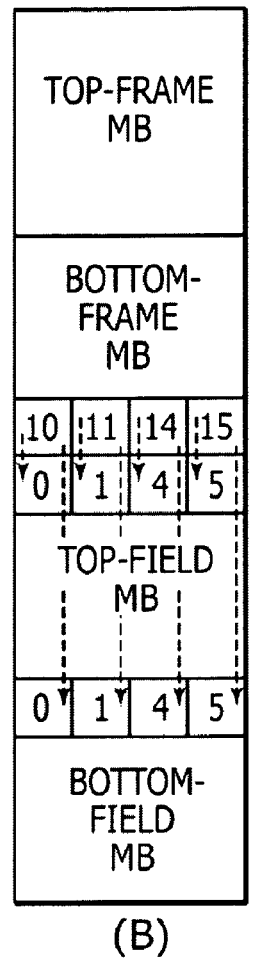
(B)
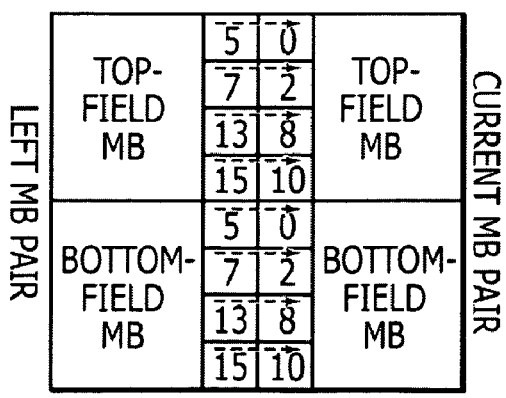
(C)
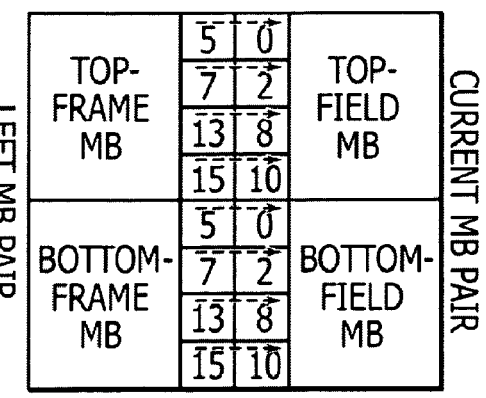
(D)

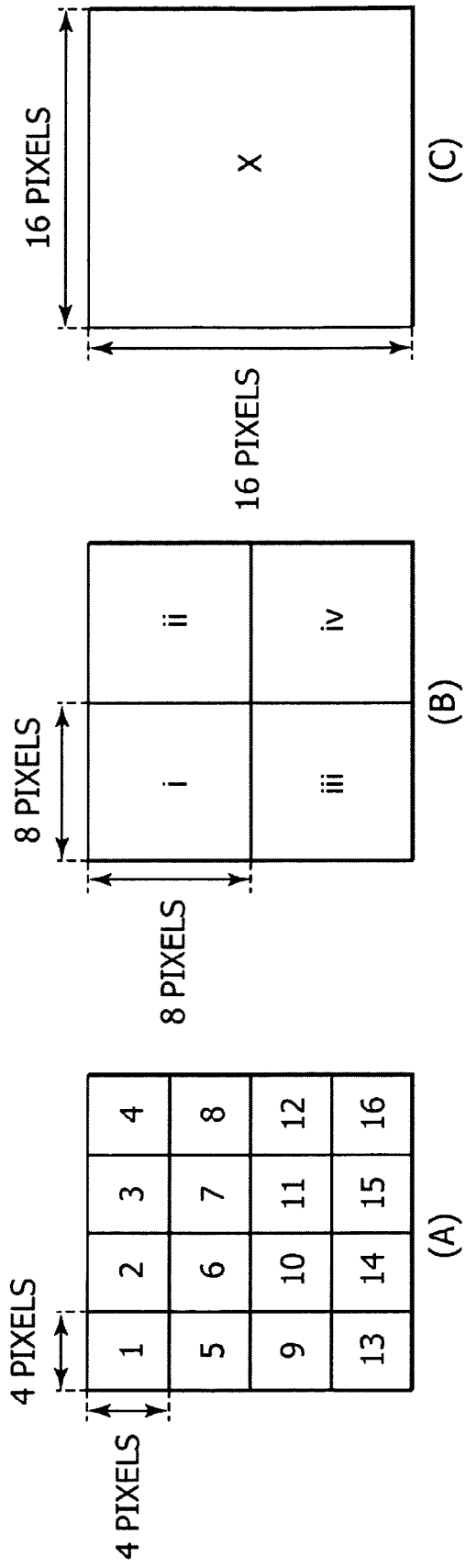

ENCODING APPARATUS, ENCODING METHOD, PROGRAM FOR ENCODING METHOD, AND RECORDING MEDIUM HAVING PROGRAM FOR ENCODING METHOD RECORDED THEREON

BACKGROUND OF THE INVENTION

1. Field of the Invention

The present invention relates to an encoding apparatus, an encoding method, a program for the encoding method, and a recording medium having the program for the encoding method recorded thereon, and is applicable to encoding apparatuses compliant with, e.g., H.264 and MPEG-4 Part 10 (Advanced Video Coding). The present invention reduces computational complexity required for selection of a best prediction mode, in a case where encoding processing is performed by detecting a prediction mode suitable for intra prediction from best prediction modes detected at different prediction value generation units, and when the encoding processing is performed on image data by selecting the best prediction mode from a multitude of prediction modes, while detecting the best prediction modes based on the different prediction value generation units by utilizing one of best prediction mode detecting processing for the other best prediction mode detecting processing.

2. Description of Related Art

In recent years, for transmission and recording of moving images at broadcasting stations, ordinary homes, and the like, apparatuses capable of efficiently transmitting and storing the image data by effectively utilizing redundancy of the image data are becoming popular. Such an apparatus which is compliant with, e.g., MPEG (Moving Picture Experts Group) effectively compresses the image data by utilizing orthogonal transforms, such as Discrete Cosine Transform, and motion compensation.

MPEG2 (ISO/IEC 13818-2) being one of data compression schemes of this type was defined as a general-purpose image encoding scheme. MPEG2 is defined as compatible with both interlace scanning and sequential scanning, as well as with both standard-resolution images and high-definition images. Presently, MPEG2 is widely used for a wide range of applications including both for professional use and consumer use. Specifically, according to MPEG2, e.g., 720×480 pixel image data based on the standard resolution and image data of the interlace scanning scheme can be compressed to a bit rate of 4 to 8 [Mbps]. Further, e.g., 1920×1088 pixel image data based on the high resolution and image data of the interlace scanning scheme can be compressed to a bit rate of 18 to 22 [Mbps], whereby high compressibility with high image quality may be maintained.

However, MPEG2 is a high image quality encoding scheme suitable for broadcasting applications, and hence is not compatible with high compression rate encoding scheme having codes less than codes of MPEG1. Meanwhile, as portable terminals have become popular in recent years, more needs for high compression rate encoding schemes having less codes than codes of MPEG1 are expected. Thus, standards for MPEG4-based encoding schemes were approved as international standard by ISO/IEC (International Organization for Standardization/International Electrotechnical Commission) 14496-2 on December 1998.

Also, as such a data compression scheme, H26L (ITU-T Q6/16 VCEG) which was initially intended for image encoding for videoconferencing is standardized. The H26L has more computational complexity compared to that of MPEG2 and MPEG4, but can maintain encoding efficiency higher than that of MPEG2 and MPEG4. Further, as part of MPEG4 activities, standardization of an encoding scheme for ensuring higher encoding efficiency by infusing various functions based on the H26L was promoted as Joint Model of Enhanced-Compression Video Coding. The scheme was set as an international standard entitled "H.264 and MPEG-4 Part 10 (Advanced Video Coding)" on March 2003. The standard is hereinafter referred to as "JVT standard" in this specification.

FIG. 5 is a block diagram showing an encoding apparatus compliant with the JVT standard. An encoding apparatus 1 selects a best prediction mode from a plurality of intra prediction modes and a plurality of inter prediction modes, and generates difference data (prediction error data) D2 by subtracting prediction values based on the selected prediction mode from image data D1. Also, the encoding apparatus 1 performs orthogonal transform processing, quantization processing, and variable length encoding processing on the difference data D2 to output encoded data D5.

In the encoding apparatus 1, analog-to-digital conversion circuit (A/D) 2 outputs the image data D1 by performing analog/digital conversion processing on a video signal S1. A screen sorting buffer 3 inputs the image data D1 outputted from the analog/digital conversion circuit 2, sorts frames of the image data D1, based on a GOP (Group of Pictures) structure for encoding processing by the encoding apparatus 1, and outputs the sorted frames.

A subtraction circuit 4 receives the image data D1 outputted from this screen sorting buffer 3, and, in intra encoding, subtracts prediction values outputted from an intra prediction circuit 5 from this image data D1, and outputs the difference data D2. Also, in inter encoding, prediction values are inputted from a motion prediction/compensation circuit 6, and the prediction values are subtracted from the image data D1 to output the difference data D2.

An orthogonal transform circuit 7 processes the output data D2 from the subtraction circuit 4 by orthogonal transform processings, such as Discrete Cosine Transform or Karhunen-Loeve Transform, and outputs coefficient data D3 being a processing result. A quantization circuit 8 quantizes the coefficient data D3 in accordance with a quantization scale by rate control of a rate control circuit 9, and outputs the quantized coefficient data D3. An invertible encoding circuit 10 performs invertible encoding processing by variable length encoding, arithmetic encoding, and the like on data outputted from the quantization circuit 8, and generates output data D4. Also, the invertible encoding circuit 10 acquires information on intra encoding, and information on inter encoding, and the like from the intra prediction circuit 5 and the motion prediction/compensation circuit 6, and sets the acquired information to header information of the output data D4.

A storage buffer 11 stores the output data D4 from the invertible encoding circuit 10, and outputs the data D4 at a transmission rate of a subsequent transmission channel. The rate control circuit 9 monitors an amount of codes occurring from the encoding processing by monitoring a remaining space in the storage buffer 11, and switches quantization scales of the quantization circuit 8 on the basis of a monitoring result, and controls the amount of codes occurring by the encoding apparatus 1.

An inverse quantization circuit 13 performs inverse quantization processing on the output data from the quantization circuit 8, and decodes the inputted data of the quantization circuit 8. An inverse orthogonal conversion circuit 14 performs inverse orthogonal conversion processing on output data from the inverse quantization circuit 13, and decodes the input data D2 of the orthogonal conversion circuit 7. The encoding apparatus 1 adds prediction values corresponding to output data from the inverse orthogonal conversion circuit 14, by use of an addition circuit (not shown), and decodes the input data of the subtraction circuit 4. A deblock filter 15 removes block distortion from output data from this addition circuit, and outputs the resultant data. A frame memory 16 records and holds the output data from the deblock filter 15 as reference image information.

The motion prediction/compensation circuit 6 detects, in inter encoding, a motion vector MV of the image data outputted from the image sorting buffer 3 based on a prediction frame by the reference image information stored in the frame memory 16, and detects a best prediction mode in the inter prediction mode. Further, when inter encoding is selected, the motion prediction/compensation circuit 6 motion-compensates the reference image information stored in the frame memory 16 by use of the corresponding motion vector MV, based on the best prediction mode, generates prediction image information, and outputs prediction values based on the prediction image information, to the subtraction circuit 4.

The intra prediction circuit 5 detects, in intra encoding, a best prediction mode in the intra prediction mode on the basis of input data of the frame memory 16. Further, when intra encoding is selected, the intra prediction circuit 5 generates prediction values of prediction image information from the input data of the frame memory 16 on the basis of the best prediction mode, and outputs the generated prediction values to the subtraction circuit 4.

In the encoding apparatus 1, a prediction mode therein is selected from the best prediction modes detected by the intra prediction circuit 5 and the motion prediction/compensation circuit 6, according to a picture for processing associated with the GOP structure, and then based on the selection result, the difference data D2 is selectively generated at the subtraction circuit 4 by the prediction values from the intra prediction circuit 5 or the motion prediction/compensation circuit 6.

FIG. 6 is a block diagram showing a decoder compliant with the JVT standard. In the decoder 20, a storage buffer 21 temporarily stores the encoded data D5 inputted via the transmission channel, and outputs the data. An invertible decoding circuit 22 processes the output data from the storage buffer 21 by variable length decoding, arithmetic decoding, and the like, and decodes the input data of the invertible encoding circuit 10 in the encoding apparatus 1. Also, at this time, if the output data is intra-encoded data, the circuit 22 decodes the intra prediction mode information stored in the header and outputs decoded information to an intra prediction circuit 23. Meanwhile, if the output data is inter-encoded data, the circuit 22 decodes the information about the motion vector stored in the header, and outputs decoded information to a motion prediction/compensation circuit 24.

An inverse quantization circuit 25 performs inverse quantization processing on the output data from the invertible decoding circuit 22, and decodes the coefficient data D3 inputted to the quantization circuit 8 of the encoding apparatus 1. An inverse orthogonal conversion circuit 26 inputs coefficient data outputted from the inverse quantization circuit 25, and performs inverse orthogonal conversion processing thereon, and decodes the difference data D2 inputted to the orthogonal conversion circuit 7 of the encoding apparatus 1.

In intra encoding, an addition circuit 27 inputs the difference data D2 outputted from the inverse orthogonal conversion circuit 26, and adds prediction values of prediction image generated at the intra prediction circuit 23 and outputs the resultant data. On the other hand, in inter encoding, prediction values of prediction image outputted from the motion prediction/compensation circuit 24 are added, and the resultant data is outputted. As a result, the addition circuit 27 decodes the input data of the subtraction circuit 4 in the encoding apparatus 1.

A deblock filter 28 removes block distortion from the output data of the addition circuit 27, and outputs resultant data. A screen sorting buffer 29 sorts frames of image data outputted from the deblock filter 28 according to the GOP structure, and outputs the sorted frames. A digital/analog conversion circuit (D/A) 30 performs digital/analog conversion processing on the output data from the screen sorting buffer 29, and outputs the converted data to the original video signal S1.

A frame memory 31 records and holds the output data from the deblock filter 28 as reference image information. The motion prediction/compensation circuit 24 motion-compensates the reference image information stored in the frame memory 31 on the basis of the motion vector information notified from the invertible decoding circuit 22, in inter encoding, generates prediction values, and outputs the prediction values to the addition circuit 27. The intra perdition circuit 23 generates prediction values from the input data of the frame memory 31 on the basis of intra prediction modes notified from the invertible decoding circuit 22, in intra encoding, and outputs the prediction values to the addition circuit 27.

In the JVT standard, three intra prediction modes are prepared: an intra 4×4 mode, an intra 8×8 mode, and an intra 16×16 mode. In the intra 4×4 mode, a block of 4 pixels×4 pixels is an orthogonal conversion processing unit, and one of the orthogonal conversion processing is a prediction value generation unit in the intra prediction circuit 5. Also, in the intra 16×16 mode, a block of 4 pixels×4 pixels is an orthogonal conversion processing unit, and 4×4 blocks (a block of 16 pixels×16 pixels) of orthogonal conversion processing of 4 pixels×4 pixels is set to be a prediction value generation unit. Meanwhile, in the intra 8×8 mode, similarly to MPEG2, a block of 8 pixels×8 pixels is an orthogonal conversion processing unit, and also serves as a prediction value generation unit. The prediction value generation units in the intra 4×4 mode, intra 8×8 mode, and intra 16×16 mode are hereinafter referred to as "block", "sub macroblock" and "macroblock", respectively.

According to the JVT standard, in these intra 4×4 mode, intra 8×8 mode, and intra 16×16 mode, the image data D1 is sequentially processed by a 16 pixel×16 pixel block unit being a macroblock of the intra 16×16 mode. Accordingly, a block formed by halving a 16 pixel×16 pixel block in the intra 16×16 mode both vertically and horizontally is a sub macroblock in the intra 8×8 mode. In the intra 8×8 mode, the sub macroblocks in the 16 pixel×16 pixel macroblock are processed in order of raster scanning. Also, a block formed by quartering a 16 pixel×16 pixel block in the intra 16×16 mode vertically and horizontally is a block in the intra 4×4 mode. In the intra 4×4 mode, the blocks in the 16 pixel×16 pixel macroblock are processed sequentially in order of raster scanning, as indicated by numbers in FIG. 7.

According to the JVT standard, in the intra 4×4 mode or intra 16×16 mode in the intra prediction mode, a prediction value is generated by using pixel values of decoded adjacent blocks or decoded adjacent macroblocks which are to be processed by the deblock filter 15. Also, in the intra 8×8 mode, similarly to MPEG2, a prediction value is generated by use of pixel values of decoded adjacent macroblocks which are already processed by the deblock filter 15.

In the JVT standard, if the video signal S1 is a video signal of the interlaced scanning scheme, encoding processing can be sequentially performed in a field mode or in a frame mode by forming two vertically continuous prediction value generation elements as a pair (hereinafter referred to as "macroblock pair"), as the processing order is indicated by an arrow in FIG. 8.

In the intra prediction mode, prediction value processings differ with respect to luminance signal depending on intra 4×4 mode, intra 8×8 mode, and intra 16×16 mode. Accordingly, in the following, the processing in the intra 4×4 mode will be described first. It is noted that the processing in the intra 8×8 mode is omitted since the processing is similar to that of MPEG2.

The intra 4×4 mode is applied when "mb part pred mode (mb type, 0)" is equal to "Intra4×4". In prediction value generation processing, luminance signal prediction values for a block for prediction value generation are generated by use of "prev intra4×4 pred mode flag", "rem intra4×4 pred mode (if available)", and pre-processed pixel values "(if available)" by the deblock filter of a peripheral luminance "block" as input parameters.

Here, when a value for "adaptive frame field flag" is 0 in the intra 4×4 mode, in the prediction value generation processing, processing for judging as to whether intra prediction of the block is "available" or "not available" is performed. In the judgment processing, as shown in FIG. 9, luminance pixel values of decoded pixels A-M contained in blocks adjacent to the block are inputted, and whether the pixel values of the adjacent pixels A-M are "available" or not with respect to a block of pixels a-p for processing is checked.

Here, a block of 4 pixels×4 pixels for prediction value generation is defined as "4×4LumaBlkLoc", and a position of an upper left pixel value of this block is defined as indexed by "4×4LumaBlckIdx". Accordingly, the block of pixels a-p in FIG. 9 is "4×4LumaBlkLoc", and "4×4LumaBlkIdx" indicates a position of the pixel labeled a. Also, a position (x,y) of the pixel d is indicated by "x:4×4LumaBlkLoc[4×4LumaBlkIdx][0]+3, y:4×4LumaBlkLoc[4×4LumaBlkIdx][1]", and a position (x,y) of the pixel A is indicated by "x:4×4LumaBlkLoc[4×4LumaBlkIdx][0], y:4×4LumaBlkLoc[4×4LumaBlkIdx][1]−1".

The pixel value of adjacent pixels A-M is judged as "not available", when the pixel is not within a picture or is not within a slice (condition 1), when the pixel belongs to a block to be processed later than the block for prediction value generation, in decoding processing (condition 2), or when "constrained intra pred flag=0" and the block belongs to an inter macroblock (condition 3). Even if the pixels E-H satisfy any of the conditions 1 to 3, the pixels E-H are judged as "available" by applying a pixel value of the pixel D when the pixel D is "available".

If "mb adaptive frame field flag" is value 1 and "field pic flag" is value 0, the adjacent pixels A-M are defined in the same way as when value of "mb adaptive frame field flag" is 0. Also, if the block is "field decoding mode" and is "top fieldmacroblock", the adjacent pixels are defined as indicated by the following formula.

[Formula 1]

A:

$x=4\times4\text{LumaBlkLoc}[4\times4\text{LumaBlkIdx}][0]$ $y=4\times4\text{LumaBlkLoc}[4\times4\text{LumaBlkIdx}][1]-2$

I:

$x=4\times4\text{LumaBlkLoc}[4\times4\text{LumaBlkIdx}][0]-1$ $y=4\times4\text{LumaBlkLoc}[4\times4\text{LumaBlkIdx}][1]$ (1)

Further, when the block is "field decoding mode" and is "bottom field macroblock", the adjacent pixels are defined as indicated by the following formula.

[Formula 2]

A:

$x=4\times4\text{LumaBlkLoc}[4\times4\text{LumaBlkIdx}][0]$ $y=4\times4\text{LumaBlkLoc}[4\times4\text{LumaBlkIdx}][1]-1$

I:

$x=4\times4\text{LumaBlkLoc}[4\times4\text{LumaBlkIdx}][0]-1$ $y=4\times4\text{LumaBlkLoc}[4\times4\text{LumaBlkIdx}][1]$ (2)

A plurality of prediction modes as shown in FIG. 10 are prepared for the intra 4×4 mode, and applicable prediction modes vary according to a judgment processing result as to whether the above-described adjacent pixels are "available" or "not available". Prediction directions when values of "Intra4×4LumaPredMode[4×4LumaBlkIdx]" are 0, 1-8 are indicated in FIG. 11 by comparison with FIG. 10. Specific prediction values of the respective prediction modes are described in detail with reference to decoding processing.

As shown in FIG. 12, macroblocks positioned above and left of a macroblock to be processed are highly relevant with the macroblock for processing. Thus, in the JVT standard, a technique by which a prediction direction of the target macroblock is predicted from the prediction directions of the decoded macroblocks positioned above and left of the macroblock is adopted.

In the prediction processing of a prediction direction using prediction directions of the adjacent macroblocks, first, address detection of the adjacent macroblocks and then "availability" verification are executed if value of "adaptive frame field flag" is 0, or if value of "field pic flag" is 1. The address detection and verification processings are executed as follows. An address "MbAddress" of the target macroblock is inputted. An address "MbAddressA" of a macroblock positioned above the target macroblock and an address "MbAddressB" of a macroblock positioned left of the target macroblock are detected. Then, "availability" is judged for the macroblocks positioned above and left of the target macroblock.

Here, a macroblock having an address "MbAddress" is judged as "not available", if conditions 1 to 4 are satisfied with respect to address MbAddress of the macroblock: "MbAddress"<0 (condition 1); "MbAddress">"MaxMbAddress−1" (condition 2); the macroblock specified by "MbAddress" belongs to a different slice (condition 3); or the macroblock specified by "MbAddress" is not decoded yet (condition 4).

This judgment processing is applied to the above- and left-positioned macroblocks to judge whether available or not available. In macroblock pair-based processing, an address "MbPairAddressA" of a macroblock pair to which the left-positioned macroblock belongs is an address "MbPairAddress−1" of a macroblock pair to which the macroblock for processing belongs, whereas an address "MbPairAddressB" of a macroblock pair to which the above-positioned macroblock belongs is an address "MbPairAddress−(frame width in mbs minus1+1)" of the macroblock pair to which the macroblock for processing belongs.

Based on the macroblock judgment result, the encoding apparatus performs the address detection and the "availability" verification of the adjacent macroblocks as follows. An input parameter of the processing is "MbAddressA" and an output is a value (four types) of a variable "ExtIntra4×4LumaPred". In the encoding apparatus, the variable "ExtIntra4×4LumaPred" is transmitted when a prediction direction is predicted from the adjacent macroblocks.

Here, when a macroblock (a macroblock indexed by "MbAddressA") which is positioned at left of the macroblock is "available" and "mb type" of the macroblock indexed by "MbAddressA" is "I 4×4" or "SI", a value of "ExtIntra4×4LumaPredMode" is obtained by the following processings. Here, "Intra4×4LumaPredMode" is a value assigned to the macroblock indexed by "MbAddressA".

[Formula 3]

for($i=0, i<4, i++$)

ExtIntra4×4LumaPredMode[($i$+1)*5]=Intra4×4LumaPredMode[4×4LumaBlkScan(3,$i$)]   (3)

Further, when the macroblock indexed by "MbAddressA" is not "available" or its "mb type" is neither "I 4×4" nor "SI", the value of "ExtIntra4×4LumaPredMode" is obtained by the following processings.

[Formula 4]

for($i=0, i<4, i++$)

ExtIntra4×4LumaPredMode[($i$+1)*5]=2   (4)

If a macroblock (a macroblock indexed by "MbAddressB") positioned above the macroblockI is "available" and "mb type"of a macroblock indexed by "MbAddressB" is "I 4×4" or "SI", a value of "ExtIntra4×4LumaPredMode" is obtained by the following processings. Here, "Intra4×4LumaPredMode" is a value assigned to the macroblock indexed by "MbAddressB".

[Formula 5]

for(i=0, $i<4, i++$)

ExtIntra4×4LumaPredMode[$i$+1]=Intra4×4LumaPredMode[4×4LumaBlkScan($i$,3)]   (5)

Further, if a macroblock indexed by "MbAddressB" is not "available" or its "mb type" is neither "I 4×4" nor "SI", the value of "ExtIntra4×4LumaPredMode" is obtained by the following processings○

[Formula 6]

for($i=0, i<4, i++$)

ExtIntra4×4LumaPredMode[$i$+1]=2   (6)

Further, in the case of the macroblock pair-based processing described above with reference to FIG. 7, in the encoding apparatus, information about an intra prediction mode of an adjacent macroblock pair is extracted and transmitted. Here, if value of "mb adaptive frame field flag" of the macroblock is 1 and value of "fieldpic flag" is 0, the processing is executed as follows.

First, when the macroblock pair is "frame mode", "ExtIntra4×4LumaPredModeTop" and "ExtIntra4×4LumaPredModeBottom" (a total of 8 types) for the macroblock are obtained from "MbPairAddressA" and "MbPairAddressB" with respect to each of "top macroblock" and "bottom macroblock".

Here, regarding "Top macroblock", "ExtIntra4×4PredModeTop" and "ExtIntra4×4PredModeTop" are obtained from Formulae (3) and (5). Also, regarding "Bottom Macroblock", "ExtIntra4×4PredModeTop" and "ExtIntra4×4PredModeTop" are obtained by Formulae (3) and (5). In the above cases, "MbPairAddressA" and "MbPairAddressB" are respectively applied to "MbAddressA" and "MbAddressB" in Formulae (3) and (5).

Further, when the macroblock pair is "field mode", "ExtIntra4×4LumaPredModeTop" and "ExtIntra4×4LumaPredModeBottom" (a total of eight types) for the macroblock are similarly obtained from "MbPairAddressA" and "MbPairAddressB" for each of "top macroblock" and "bottom macroblock".

Here, for the adjacent macroblock pair "MbPairAddressA", both "ExtIntra4×4LumaPredModeTop" and "ExtIntra4×4LumaPredModeBottom" are obtained by Formula (3). Here, "MbPairAddressA" is applied to "MbAddressA" in Formula (3).

It is noted that if the adjacent macroblock pair "MbPairAddressB" is "fieldmode", or if the adjacent macroblock pair "MbPairAddressB" is not "available" and the macroblock pair is "top macroblock", "ExtIntra4×4LumaPredModeTop" is obtained by Formula (5). In this case, "top macroblock" of "MB Pair" indexed by "MBPairAddressB" is applied to "MBAddressB" in Formula (5).

If the adjacent macroblock pair "MbPairAddressB" is "field mode", or if the adjacent macroblock pair "MbPairAddressB" is not "available" and the macroblock pair is "bottom macroblock", "ExtIntra4×4LumaPredModeBottom" is obtained by Formula (5). In this case, "top macroblock" of "MB Pair" indexed by "MBPairAddressB" is applied to "MBAddressB" in Formula (5).

Further, when the adjacent macroblock pair "MbPairAddressB" is "frame mode", with respect to "top macroblock" in the macroblock pair, "ExtIntra4×4LumaPredModeTop" is obtained by application of Formula (5). However, "top macroblock" of the macroblock pair indexed by "MBPairAddressB" is applied to "MBAddressB" in Formula (5). Also, for "bottom macroblock" in the macroblock pair, "ExtIntra4×4LumaPredModeBottom" is obtained by application of Formula (5). However, "bottom macroblock" of the macroblock pair indexed by "MBPairAddressB" is applied to "MBAddressB" in Formula (5).

FIGS. 13A to 13D are diagrams showing relation between macroblock pairs based on results of the processing performed when the macroblock pairs are "field mode".

Decoding processing for "Intra4×4LumaPredMode" for macroblocks is executed as follows. The processing here is applied in a case where value of "adaptive frame field flag" is 1, or a case where value of "field pic flag" is 1, and is described with the following pseudo codes which use "prev intra4×4 pred mode flag", "rem intra4×4 pred mode", and "ExtIntra4×4LumaPredMode".

[Formula 7]

$$\begin{aligned}
&\text{for } (4\times4LumaBlkIdx = 0, 4\times4LumaBlkIdx \times 16, 4\times4LumaBlkIdx++)[ \qquad (7)\\
&\quad i = 4\times4LumaBlkIdx + RasterTo4\times4LumaBlkOffset(4\times4LumaBlkIdx)\\
&\quad Ext4\times4LumaBlkIdx = 5*(i/4+1)+(i\ \%\ 4)+1\\
&\quad PredIntra4\times4LumaPredMode\\
&\qquad = \text{Min}(ExtIntra4\times4LumaPredMode[Ext4\times4LumaBlkIdx-1],\\
&\qquad\quad ExtIntra4\times4LumaPredMode[Ext4\times4LumaBlkIdx5])\\
\\
&\text{if } (\text{prev\_intra}4\times4\_\text{pred mode flag}[4\times4LumaBlkIdx])\\
&\quad Intra4\times4LumaPredMode[4\times4LumaBlkIdx] =\\
&\qquad\qquad\qquad\qquad\qquad\qquad PredIntra4\times4LumaPredMode\\
&\text{else }[\\
&\text{if } (\text{rem\_intra}4\times4\_\text{pred\_mode}[4\times4LumaBlkIdx] <\\
&\qquad\qquad\qquad\qquad\qquad PredIntra4\times4LumaPredMode)\\
&\quad Intra4\times4LumaPredMode[4\times4LumaBlkIdx]\\
&\qquad = \text{rem\_intra}4\times4\_\text{pred\_mode}[4\times4LumaBlkIdx]\\
&\text{else}\\
&\quad Intra4\times4LumaPredMode[4\times4LumaBlkIdx]\\
&\qquad = \text{rem\_intra}4\times4\_\text{pred\_mode}[4\times4LumaBlkIdx]+1\\
&]\\
&ExtIntra4\times4LumaPredMode[Ext4\times4LumaBlkIdx]\\
&= Intra4\times4LumaPredMode[4\times4LumaBlkIdx]\\
&]
\end{aligned}$$

Meanwhile, decoding processing for "Intra4×4LumaPredMode" for the macroblock pair described above with reference to FIG. 7 is executed as follows. The processing here is applied if value of "mb adaptive frame field flag" is 1 and value of "field pic flag" is 0. This processing is executed by processing of the pseudo codes in Formula (7) which uses "prev intra4×4 pred mode flag", "rem intra4×4 pred mode", and "ExtIntra4×4LumaPredModeTop" for "top macrolock" of the macroblock pair. The obtained "Intra4×4LumaPredMode" is assigned to "top macroblock" of the macroblock pair. Also, "Intra4×4LumaPredMode" is obtained by processing of the pseudo codes in Formula (7) which uses "prev intra4×4 pred mode flag", "rem intra4×4 pred mode", and "ExtIntra4×4LumaModePredTop" for "bottom macroblock" of the macroblock pair, and is assigned to "bottom macroblock" of the macroblock pair.

Further, in decoding processing for intra prediction in the intra 4×4 mode, prediction pixel values on a block specified by "4×4LumaBlkIdx", using the pixel values of the adjacent pixels A-M and "Intra4×4LumaPredMode[4×4LumaBlkIdx]" defined for 4×4 blocks are obtained.

Here, "Vertical" prediction is applied when value of "Intra4×4LumaPredMode[4×4LumaBlkIdx]" is 0, and is applied only when the adjacent pixels A-D are "available". The respective prediction values are indicated by the following formula.

[Formula 8]

$$a, e, i, m : A \qquad (8)$$
$$b, f, j, n : B$$
$$c, g, k, o : C$$
$$d, h, l, p : D$$

Further, "Horizontal" prediction is applied when value of "Intra4×4LumaPredMode[4×4LumaBlkIdx]" is 1, and is applied only when the adjacent pixels I-L are "available". The respective prediction values are indicated by the following formula.

[Formula 9]

$$a, b, c, d : I, \qquad (9)$$
$$e, f, g, h : J,$$
$$i, j, k, l : K,$$
$$m, n, o, p : L,$$

Further, "DC" prediction is applied when value of "Intra4×4LumaPredMode[4×4LumaBlkIdx]" is 2, and when all the adjacent pixels A-L are "available", prediction values are indicated by the following formula.

[Formula 10]

$$(A+B+C+D+I+J+K+L+4)>>3 \qquad (10)$$

On the other hand, if all the adjacent pixels A-D are "not available", the prediction values are indicated by the following formula.

[Formula 11]

$$(I+J+K+L+2)>>2 \qquad (11)$$

Further, if all the adjacent pixels I-L are "not available", the prediction values are indicated by the following formula.

[Formula 12]

$$(A+B+C+D+2)>2 \qquad (12)$$

Further, when all the adjacent pixels A-L are "not available", the prediction values are set to be 128.

On the other hand, "Diagonal Down Left" prediction is applied when value of "Intra4×4LumaPredMode[4×4LumaBlkIdx]" is 3, is applied only when the adjacent pixels A-M are "available", and the prediction values are indicated by the following formula.

[Formula 13]

$$\begin{aligned}
a: & \quad (A+2B+C+2) >> 2 \\
b,e: & \quad (B+2C+D+2) >> 2 \\
c,f,i: & \quad (C+2D+E+2) >> 2 \\
d,g,j,m: & \quad (D+2E+F+2) >> 2 \\
h,k,n: & \quad (E+2F+G+2) >> 2 \\
l,o: & \quad (F+2G+H+2) >> 2 \\
p: & \quad (G+3H+2) >> 2
\end{aligned} \quad (13)$$

Further, "Diagonal Down Right" prediction is applied if "Intra4×4LumaPredMode[4×4LumaBlkIdx]" is 4, and is applied only if the adjacent pixels A-M are "available". The prediction values are indicated by the following formula.

[Formula 14]

$$\begin{aligned}
m: & \quad (J+2K+L+2) >> 2 \\
i,n: & \quad (I+2J+K+2) >> 2 \\
e,j,o: & \quad (M+2I+J+2) >> 2 \\
a,f,k,p: & \quad (A+2M+I+2) >> 2 \\
b,g,l: & \quad (M+2A+B+2) >> 2 \\
c,h: & \quad (A+2B+C+2) >> 2 \\
d: & \quad (B+2C+D+2) >> 2
\end{aligned} \quad (14)$$

Further, "Diagonal Vertical Right" prediction is applied if value of "Intra4×4LumaPredMode[4×4LumaBlkIdx]" is 5, and is applied only if the adjacent pixels A-M are "available". The prediction values are indicated by the following formula.

[Formula 15]

$$\begin{aligned}
a,j: & \quad (M+A+1) >> 1 \\
b,k: & \quad (A+B+1) >> 1 \\
c,l: & \quad (B+C+1) >> 1 \\
d: & \quad (C+D+1) >> 1 \\
e,n: & \quad (I+2M+A+2) >> 2 \\
f,o: & \quad (M+2A+B+2) >> 2 \\
g,p: & \quad (A+2B+C+2) >> 2 \\
h: & \quad (B+2C+D+2) >> 2 \\
i: & \quad (M+2I+J+2) >> 2 \\
m: & \quad (I+2J+K+2) >> 2
\end{aligned} \quad (15)$$

Further, "Horizontal Down" prediction is applied when value of "Intra4×4LumaPredMode[4×4LumaBlkIdx]" is 6, and is applied only when the adjacent pixels A-M are "available". The prediction values are indicated by the following formula.

[Formula 16]

$$\begin{aligned}
a,g: & \quad (M+I+1) >> 1 \\
b,h: & \quad (I+2M+A+2) >> 2 \\
c: & \quad (M+2A+B+2) >> 2 \\
d: & \quad (A+2B+C+2) >> 2 \\
e,k: & \quad (I+J+1) >> 1 \\
f,l: & \quad (M+2I+J+2) >> 2 \\
i,o: & \quad (J+K+1) >> 1 \\
j,p: & \quad (I+2J+K+2) >> 2 \\
m: & \quad (K+L+1) >> 1 \\
n: & \quad (J+2K+L+2) >> 2
\end{aligned} \quad (16)$$

Further, "Vertical Left" prediction is applied when value of "Intra4×4LumaPredMode[4×4LumaBlkIdx]" is 7, and is applied only when the adjacent pixels A-M are "available". The prediction values are indicated by the following formula.

[Formula 17]

$$\begin{aligned}
a: & \quad (A+B+1) >> 1 \\
b,i: & \quad (B+C+1) >> 1 \\
c,j: & \quad (C+D+1) >> 1 \\
d,k: & \quad (D+E+1) >> 1 \\
l: & \quad (E+F+1) >> 1 \\
e: & \quad (A+2B+C+2) >> 2 \\
f,m: & \quad (B+2C+D+2) >> 2 \\
g,n: & \quad (C+2D+E+2) >> 2 \\
h,o: & \quad (D+2E+F+2) >> 2 \\
p: & \quad (E+2F+G+2) >> 2
\end{aligned} \quad (17)$$

Further, "Horizontal Up" prediction is applied when value of "Intra4×4LumaPredMode[4×4LumaBlkIdx]" is 8, and is applied only when the adjacent pixels A-M are "available". The prediction values are indicated by the following formula.

[Formula 18]

$$\begin{aligned}
a: & \quad (I+J+1) >> 1 \\
b: & \quad (I+2J+K+2) >> 2 \\
c,e: & \quad (J+K+1) >> 1 \\
d,f: & \quad (J+2K+L+2) >> 2 \\
g,i: & \quad (K+L+1) >> 1 \\
h,j: & \quad (K+3L+2) >> 2 \\
k,l,m,n,o,p: & \quad L
\end{aligned} \quad (18)$$

Processings with respect to the intra 16×16 mode are described next. Here, the intra 16×16 mode is applied when "mb part pred mode(mb type,0) is equal to "Intra16×16". In the prediction value generation processing, prediction values of luminance signal with respect to the macroblock is generated by using "mb type" for the macroblock and pixel values which are not processed yet by the deblock filter 15 of adjacent pixels of the, as input parameters.

Here, pixel values belonging to the macroblock is represented as P(x,y); x,y=0 to 15. Further, adjacent pixel values are represented as P(x,−1) and P(−1,y); x,y=−1 to 15. If the following condition 1 or 2 is satisfied for the pixel values P(x,−1) and P(−1,y), the pixel value P(x,y) is judged as "not available". The condition 1 is a case where a prediction value generation source is not present in the picture or in the slice, whereas the condition 2 is a case where the adjacent pixel values belong to a non-intra macroblock and value of "constrained intra pred flag" is 1.

In the intra 16×16 mode, modes 0-3 are defined by judging the pixel value P(x,y). Here, mode 0 is "vertical" prediction, and is applied only if the pixel values P(x,−1); x,y=−1 to 15 are "available", and the prediction values are indicated by the following formula.

[Formula 19]

$$\mathrm{Pred}(x,y)=P(x,-1);\ x,y=0\ldots15 \quad (19)$$

Further, model is "horizontal" prediction, and is applied only if the pixel values P(−1,y); x,y=−1 to 15 are "available". The prediction values are indicated by the following formula.

[Formula 20]

$$Pred(x,y)=P(-1,y); x,y=0\ldots15 \quad (20)$$

Further, mode 2 is "DC" prediction, and when all the pixel values P(x,−1) and P(−1,y);x,y=−1 to 15 are "available", the prediction values are indicated by the following formula.

[Formula 21]

$$Pred(x, y) = \left[\sum_{x'=0}^{15} P(x', -1) + \sum_{y'=0}^{15} P(-1, y') + 16\right] >> 5 \quad (21)$$

with $x, y = 0 \ldots 15$

Further, in mode 2, if the pixel values P(x,−1);x,y=−1 to 15 are "not available", the prediction values are indicated by the following formula.

[Formula 22]

$$Pred(x, y) = \left[\sum_{y'=0}^{15} P(-1, y') + 8\right] >> 4 \quad (22)$$

with $x, y = 0 \ldots 15$

Further, in mode 2, if the pixel values P(−1,y);x,y=−1 to 15 are "not available", the prediction values are indicated by the following formula.

[Formula 23]

$$Pred(x, y) = \left[\sum_{x'=0}^{15} P(x', -1) + 8\right] >> 4 \quad (23)$$

with $x, y = 0 \ldots 15$

Further, if all the pixel values P(x,−1) and P(−1,y); x,y=−1 to 15 are "not available", the prediction values are set to be value 128.

On the other hand, mode 3 is "plane" prediction, and is applied only when all the pixel values P(x,−1) and P(−1,y); x,y=−1 to 15 are "available". The prediction values are indicated by the following formula. It is noted that Clip( ) represents clip processing within a range from 0 to 255.

[Formula 24]

$$Pred(x, y) = Clip1((a + b \cdot (x - 7) + c \cdot (y - 7) + 16) >> 5) \quad (24)$$
$$a = 16 \cdot (P(-1, 15) + P(15, -1))$$
$$b = (5 \cdot H + 32) >> 6$$
$$c = (5 \cdot V + 32) >> 6$$
$$H = \sum_{x=1}^{8} x \cdot (P(7 + x, -1) - P(7 - x, -1))$$
$$V = \sum_{y=1}^{8} y \cdot (P(-1, 7 + y) - P(-1, 7 - y))$$

Intra prediction of chrominance signal is described next. Here, intra prediction of chrominance signal is applied only to "I" macroblocks and "SI" macroblocks, and generates chrominance signal prediction values for a macroblock by using "intra chroma pred mode", and adjacent pixel values which are not yet processed by the deblock filter 15, as input parameters.

Here, a pixel value belonging to the macroblock is represented as P(x,y); x,y=0 to 7. Further, adjacent pixel values are represented as P(x,−1) and P(−1,y);x,y=−1 to 7. It is noted that intra prediction modes with respect to chrominance signals can be set independently from prediction modes of luminance signal. If condition 1 or condition 2 is satisfied for the pixel values P(x,−1) and P(−1,y), the pixel value P(x,y) is judged as "not available". It is noted that condition 1 is a case where a prediction value generation source is not present in the picture or in the slice, whereas condition 2 is a case where the adjacent pixel values belong to anon-intra macroblock and value of "constrained intra pred flag" is 1.

In the chrominance signal intra prediction mode, modes 0-3 are defined by judgment of the pixel value P(x,y). Here, mode 0 is "DC" prediction, and when P(x,−1) and P(−1,y) are "available", the prediction values are indicated by the following formula.

[Formula 25]

$$Pred(x, y) = \left[\left(\sum_{n=0}^{7} (P(-1, n) + P(n, -1))\right) + 8\right] >> 4 \quad (25)$$

with $x, y = 0 \ldots 7$

Meanwhile, if the pixel value P(−1,y) is "not available", the prediction values are indicated by the following formula.

[Formula 26]

$$Pred(x, y) = \left[\left(\sum_{n=0}^{7} P(n, -1)\right) + 4\right] >> 3 \quad (26)$$

with $x, y = 0 \ldots 7$

Further, if the pixel value P(x,−1) is "not available", the prediction values are indicated by the following formula.

[Formula 27]

$$Pred(x, y) = \left[\left(\sum_{n=0}^{7} P(-1, n)\right) + 4\right] >> 3 \quad (27)$$

with $x, y = 0 \ldots 7$

Further, if the pixel values P(x, −1) and P(−1,y) are "not available", the prediction values are set to be value 128.

Further, mode 1 is "horizontal" prediction, and is applied only when the pixel value P(−1,y) is "available". The prediction values are indicated by the following formula.

[Formula 28]

$$Pred(x,y)=P(-1,y), x,y=0,\ldots,7 \quad (28)$$

Further, mode 2 is "vertical" prediction, and is applied only when the pixel value P(x,−1) is "available". The prediction values are indicated by the following formula.

[Formula 29]

$$Pred(x,y)=P(x,-1), x,y=0,\ldots,7 \quad (29)$$

Further, mode 3 is "plane" prediction, and is applied only when the pixel values P(x,−1) and P(−1,y) are "available". The prediction values are indicated by the following formula.

[Formula 30]

$$Pred(x, y) = Clip1(a + b \cdot (x-3) + c \cdot (y-3) + 16) >> 5; \quad (30)$$
$$x, y = 0, \ldots, 7$$
$$a = 16 \cdot (P(-1,7) + P(7,-1))$$
$$b = (17 \cdot H + 16) >> 5$$
$$c = (17 \cdot V + 16) >> 5$$
$$H = \sum_{x=1}^{4} x \cdot [P(3+x,-1) - P(3-x,1)]$$
$$V = \sum_{y=1}^{4} y \cdot [P(-1, 3+y) - P(-1, 3-y)]$$

The encoding apparatus selects a best prediction mode from the various prediction modes, and performs encoding processing on the image data D1. Here, Org(i,j) is assumed to be a pixel value on the original image in the 4×4 blocks, and Pred(mode,i,j) is assumed to be a prediction value by the intra prediction mode indicated by mode (i,j). The encoding apparatus sets a prediction mode in which prediction error is minimized by computation processing based on the following formula, as a best prediction mode.

[Formula 31]

$$SAD(\text{mode}) = \sum_{i=0}^{3}\sum_{j=0}^{3} |Org(i, j) - Pred(\text{mode}, i, j)| \quad (31)$$

Here, SAD is a function which selects a mode of a minimum value, and as shown by the following formula, SATD (mode) may alternatively be applied in place of SAD.

[Formula 32]

$$SATD(\text{mode}) = \sum_{i=0}^{3}\sum_{j=0}^{3} |Hadamard(Org(i, j) - Pred(\text{Mode}, i, j))| \quad (32)$$

Hadamard( ) represents an Hadamard conversion operation, and is executed by multiplying a target matrix by an Hadamard conversion matrix, as indicated by the following formula.

[Formula 33]

$$Hadamard(A)=H^T A H \quad (33)$$

Noted "H" is the Hadamard conversion matrix, and fourth order matrix is represented by the following formula.

[Formula 34]

$$H = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (34)$$

"$H^T$" represents a transposed Hadamard conversion matrix H.

Practically, in the encoding apparatus 1, as shown in FIGS. 14A to 14C, SAD(mode) or SATD(mode) is obtained on a block unit basis of 16 pixel×16 pixel, per prediction mode based on the intra 4×4 mode, intra 8×8 mode, and intra 16×16 mode, or a mode of a minimum value by a cost function in which a header bit component-based codes are added to codes generated by each mode is selected, in order to select a best prediction mode. A relation with macroblocks in each prediction mode is also shown in FIG. 14D.

Alternatively, a header bit in a case where the 16 pixel×16 pixel block is encoded at each intra prediction mode "mode-"may be represented as SAD0(mode) or SATD0(mode), and a prediction mode in which a cost value "Cost" represented by the SAD0(mode) or SATD0(mode) is set to be minimum, is assumed to be a best prediction mode. Noted, the cost value "Cost"is represented by the following formula, and $QP_0$ (QP) is a function linking a quantization parameter QP with the quantization scale used for actual quantization. The cost value is a value in each prediction mode obtained by the cost function used in judging a prediction mode, and also is a value as an index indicating the amount of occurring codes. Specifically, the cost value is a value on the right side in each prediction mode, in Formulae (31) and (32).

[Formula 35]

$$\text{Cost}=SAD(\text{mode})+QP_0(QP)\cdot SAD_0(\text{mode}) \quad (35)$$

Noted the following formula may be applied in place of Formula (35).

[Formula 36]

$$\text{Cost}=SATD(\text{mode})+QP_0(QP)\cdot SATD_0(\text{mode}) \quad (36)$$

Regarding such encoding processing based on various prediction modes, for example, Japanese Unexamined Patent Application Publication No. 2005-151017 proposes a method in which processing of selecting a best mode is simplified by narrowing prediction modes based on a resolution or the like of an image for processing.

Meanwhile, the processing of selecting a best prediction mode from a multitude of prediction modes contain an issue of expanded computational complexity. Particularly, in the intra 4×4 mode, intra 8×8 mode, and intra 16×16 mode, cost values have to be calculated for 9, 9, and 4 prediction directions respectively per a block, and thus enormous computation complexity is required for calculation of the cost values.

SUMMARY OF THE INVENTION

The present invention is made in view of the issues, and it is desirable to provide an encoding apparatus, an encoding method, a program for the encoding method, and a recording medium having the program for the encoding method recorded thereon, which are capable of reducing computational complexity for selecting a best prediction mode, in a case where encoding processing is performed on image data by selecting the best prediction mode from a multitude of prediction modes.

According to an embodiment of the present invention, the present invention is applied to an encoding apparatus for generating, in an intra prediction mode, difference data by subtracting prediction values from input image data, and for processing the difference data and performing encoding processing on the input image data. The encoding apparatus includes a first prediction mode detecting section for detecting a first best prediction mode which is most suitable for the encoding processing on the first prediction value generation unit basis, from a plurality of prediction modes on the first prediction value generation unit basis, a second prediction mode detecting section for detecting a second best prediction mode most suitable for the encoding processing on a second prediction value generation unit basis from a plurality of prediction modes in the second prediction value generation unit which is the divided first prediction value generation unit, and a prediction value generating section for selecting a best prediction mode of encoding processing most suitable for the encoding processing from the first and the second best prediction modes and generating the prediction values on the basis of the best prediction mode of the encoding processing. The first prediction mode detecting section detects the first best prediction mode by utilizing processing in the second prediction mode detecting section.

According to another embodiment of the present invention, the present invention is applied to an encoding apparatus for generating, in an intra prediction mode, difference data by subtracting prediction values from input image data, and performing encoding processing on the input image data by processing the difference data. The encoding apparatus includes a first prediction mode detecting section for detecting a first best prediction mode which is most suitable for the encoding processing in a first prediction value generation unit, from a plurality of prediction modes in the first prediction value generation unit, a second prediction mode detecting section for detecting a second best prediction mode most suitable for the encoding processing in a second prediction value generation unit, from a plurality of prediction modes in the second prediction value generation unit which is the divided first prediction value generation unit, and a prediction value generating section for selecting a best encoding processing prediction mode most suitable for the encoding processing from the first and the second best prediction modes and generating the prediction values on the basis of the best encoding processing prediction mode. The second prediction mode detecting section detects the second best prediction mode by utilizing processing in the first prediction mode detecting section.

According to still another embodiment of the present invention, there is provided a encoding method for generating, in an intra prediction mode, difference data by subtracting prediction values from input image data, and performing encoding processing on the input image data by processing the difference data. The encoding method includes a first prediction mode detecting step of detecting a first best prediction mode which is most suitable for the encoding processing in a first prediction value generation unit, from a plurality of prediction modes in the first prediction value generation unit, a second prediction mode detecting step of detecting a second best prediction mode most suitable for the encoding processing in the second prediction value generation unit, from a plurality of prediction modes in the second prediction value generation unit which is the divided first prediction value generation unit, and a prediction value generating step of selecting a best encoding processing prediction mode which is most suitable for the encoding processing from the first and the second best prediction modes and generating the prediction values on the basis of the best encoding processing prediction mode. The first prediction mode detecting step detects the first best prediction mode by utilizing processing in the second prediction mode detecting step.

In still another embodiment of the present invention, there is provided an encoding method for generating, in an intra prediction mode, difference data by subtracting prediction values from input image data, and performing encoding processing on the input image data by processing the difference data. The encoding method includes a first prediction mode detecting step of detecting a first best prediction mode which is most suitable for the encoding processing in a first prediction value generation unit, from a plurality of prediction modes in the first prediction value generation unit, a second prediction mode detecting step of detecting a second best prediction mode most suitable for the encoding processing in a second prediction value generation unit from a plurality of prediction modes in the second prediction value generation unit which is the divided first prediction value generation unit, and a prediction value generating step of selecting a best encoding processing prediction mode which is most suitable for the encoding processing from the first and the second best prediction modes and generating the prediction values on the basis of the best encoding processing prediction mode. The second prediction mode detecting step detects the second best prediction mode by utilizing processing in the first prediction mode detecting step.

In still another embodiment of the present invention, there is provided a program for an encoding method for generating, in an intra prediction mode, difference data by subtracting prediction values from input image data, and performing encoding processing on the input image data by processing the difference data. The program for the encoding method includes a first prediction mode detecting step of detecting a first best prediction mode which is most suitable for the encoding processing in a first prediction value generation unit, from a plurality of prediction modes in the first prediction value generation unit, a second prediction mode detecting step of detecting a second best prediction mode most suitable for the encoding processing in a second prediction value generation unit from a plurality of prediction modes in the second prediction value generation unit which is the divided first prediction value generation unit, and a prediction value generating step of selecting a best encoding processing prediction mode which is most suitable for the encoding processing from the first and the second best prediction modes and generating the prediction values on the basis of the best encoding processing prediction mode. The first prediction mode detecting step detects the first best prediction mode by utilizing processing in the second prediction mode detecting step.

In still another embodiment of the present invention, there is provided a program for an encoding method for generating, in an intra prediction mode, difference data by subtracting prediction values from input image data, and performing encoding processing on the input image data by processing the difference data. The program includes a first prediction mode detecting step of detecting a first best prediction mode which is most suitable for the encoding processing in a first prediction value generation unit, from a plurality of prediction modes in the first prediction value generation unit, a second prediction mode detecting step of detecting a second best prediction mode most suitable for the encoding processing in a second prediction value generation unit from a plurality of prediction modes in the second prediction value generation unit which is the divided first prediction value generation unit, and a prediction value generating step of selecting a best encoding processing prediction mode most suitable for the encoding processing from the first and the second best prediction modes and generating the prediction values on the basis of the best encoding processing prediction mode. The second prediction mode detecting step detects the second best prediction mode by utilizing processing in the first prediction mode detecting step.

In still another embodiment of the present invention, there is provided a first recording medium having recorded thereon a program for an encoding method for generating, in an intra prediction mode, difference data by subtracting prediction values from input image data, and performing encoding processing on the input image data by processing the difference data. The program includes a first prediction mode detecting step of detecting a first best prediction mode which is most suitable for the encoding processing in a first prediction value generation unit, from a plurality of prediction modes in the first prediction value generation unit, a second prediction mode detecting step of detecting a second best prediction mode most suitable for the encoding processing in a second prediction value generation unit from a plurality of prediction modes in the second prediction value generation unit which is the divided first prediction value generation unit, and a prediction value generating step of selecting a best encoding processing prediction mode which is most suitable for the encoding processing from the first and the second best prediction modes and generating the prediction values on the basis of the best encoding processing prediction mode. The first prediction mode detecting step detects the first best prediction mode by utilizing processing in the second prediction mode detecting step.

In still another embodiment of the present invention, there is provided a recording medium having recorded thereon a program for an encoding method for generating, in an intra prediction mode, difference data by subtracting prediction values from input image data, and performing encoding processing on the input image data by processing the difference data. The program includes a first prediction mode detecting step of detecting a first best prediction mode which is most suitable for the encoding processing in a first prediction value generation unit, from a plurality of prediction modes in the first prediction value generation unit, a second prediction mode detecting step of detecting a second best prediction mode most suitable for the encoding processing in a second prediction value generation unit from a plurality of prediction modes in the second prediction value generation unit which is the divided first prediction value generation unit, and a prediction value generating step of selecting a best encoding processing prediction mode which is most suitable for the encoding processing from the first and the second best prediction modes and generating the prediction values on the basis of the best encoding processing prediction mode. The second prediction mode detecting step detects the second best prediction mode by utilizing processing in the first prediction mode detecting step.

According to configurations of the first encoding apparatus, encoding method, program for the encoding method, and recording medium having recorded thereon the program for the encoding method, the first prediction mode is detected by utilizing processing for detecting the second best prediction mode, and thus computational complexity required for detecting the first prediction mode may be reduced. Accordingly, computational complexity required for selecting a best prediction mode can be reduced when encoding processing is performed on image data by selecting the best prediction mode from a multitude of prediction modes.

According to configurations of the encoding apparatus, encoding method, program for the encoding method, and recording medium having recorded thereon the program for the encoding method, the second prediction mode is detected by utilizing processing for detecting the first best prediction mode, and thus computational complexity for detecting the second prediction mode can be reduced. Accordingly, computational complexity required for selecting a best prediction mode can be reduced when encoding processing is performed on image data by selecting the best prediction mode from a multitude of prediction modes.

According to embodiments of the present invention, computational complexity required for selecting a best prediction mode can be reduced when encoding processing is performed on image data by selecting the best prediction mode from a multitude of prediction modes.

BRIEF DESCRIPTION OF THE DRAWINGS

FIG. 9 is a schematic line drawing for illustrating prediction value generation;

FIG. 10 is a table showing prediction modes in an intra 4×4 mode;

FIGS. 13A to 13D are schematic line drawings for illustrating processing of the macroblock pair; and FIGS. 14A to 14D are schematic line drawings showing relation of macroblocks in each prediction mode.

DETAILED DESCRIPTION OF THE EMBODIMENTS

Figure 2:
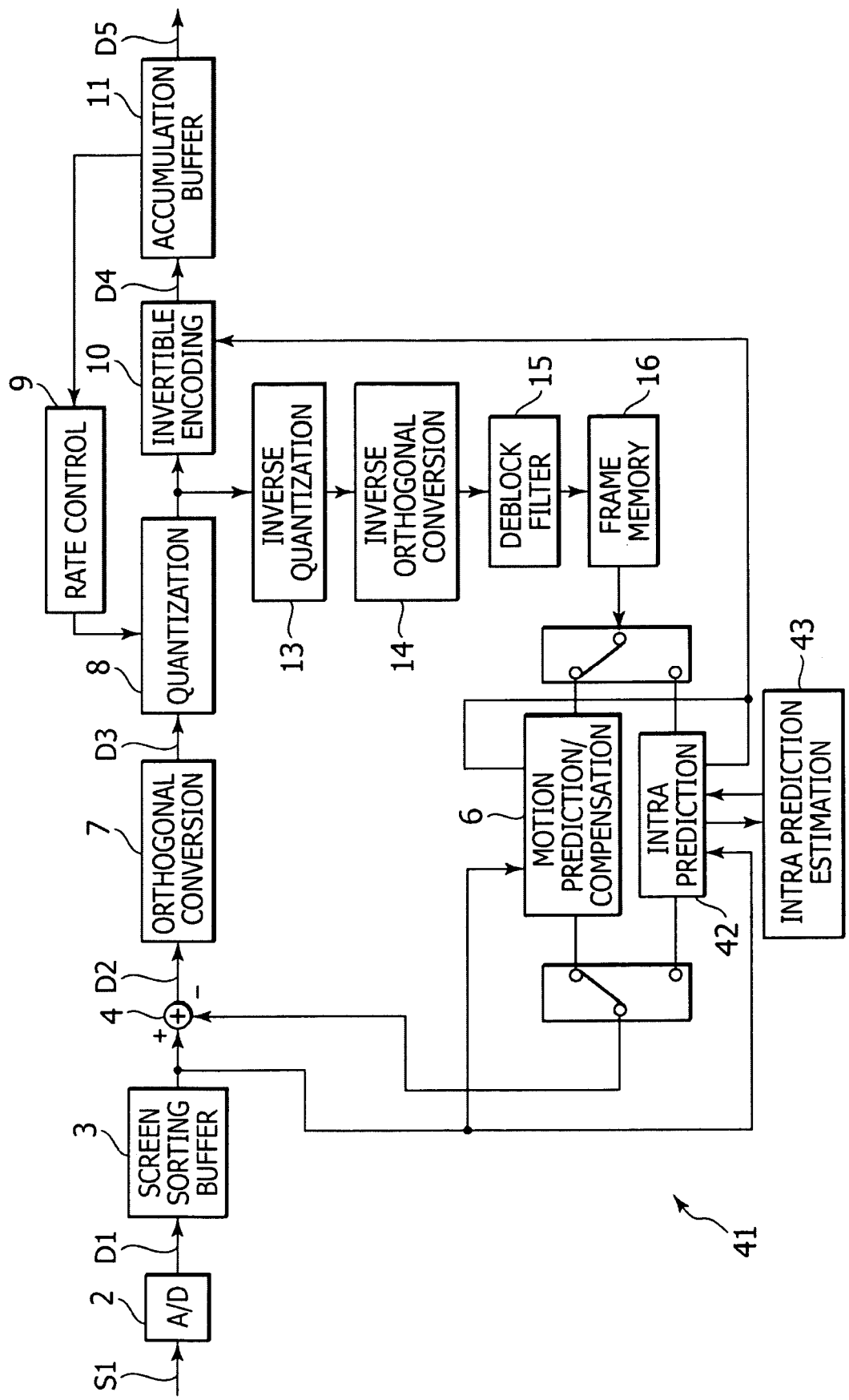
FIG. 2 is a block diagram showing the encoding apparatus according to Embodiment 1 of the present invention.
Figure 5:
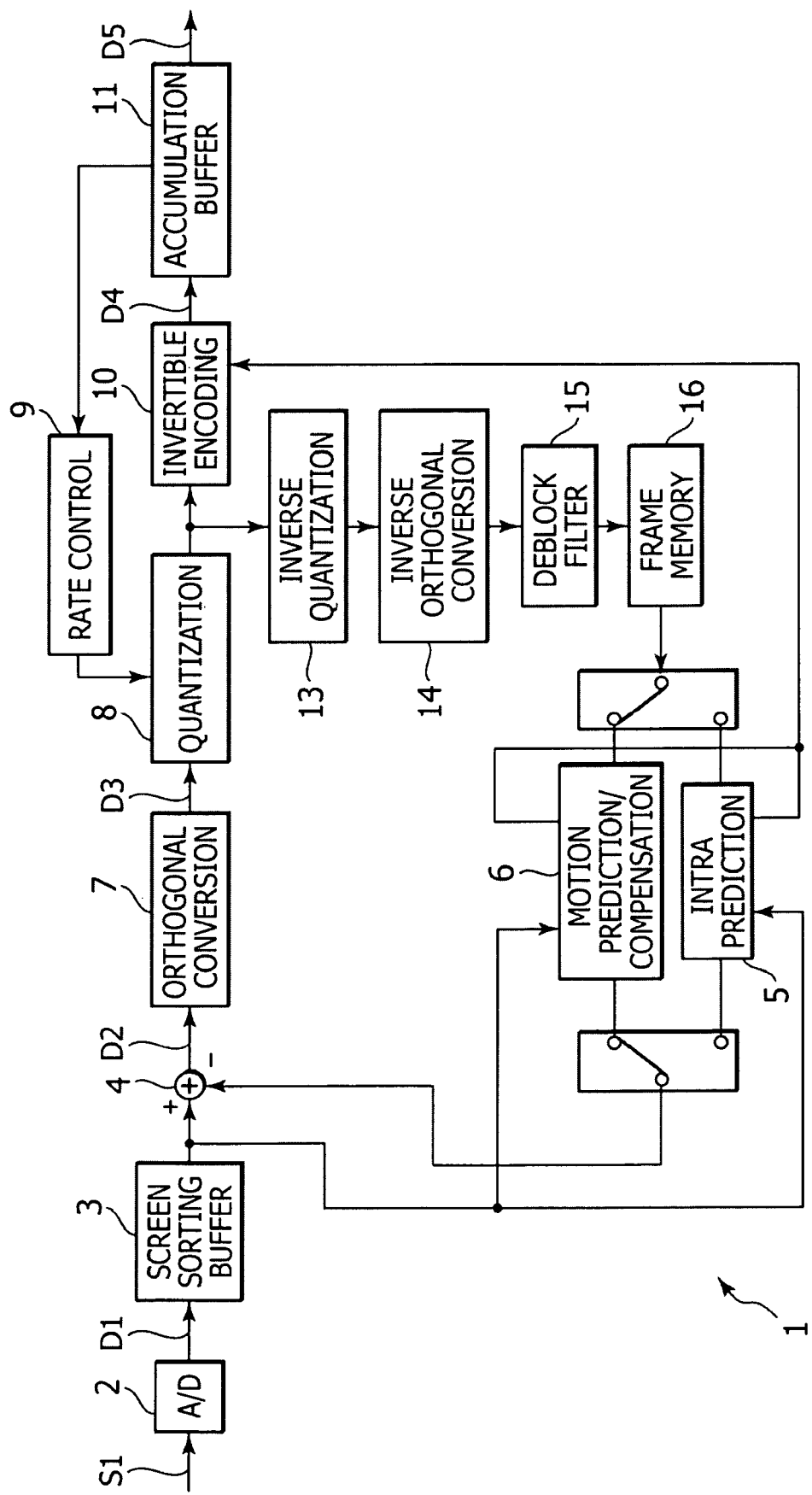
FIG. 5 is a block diagram showing a related-art encoding apparatus.
Figure 6:
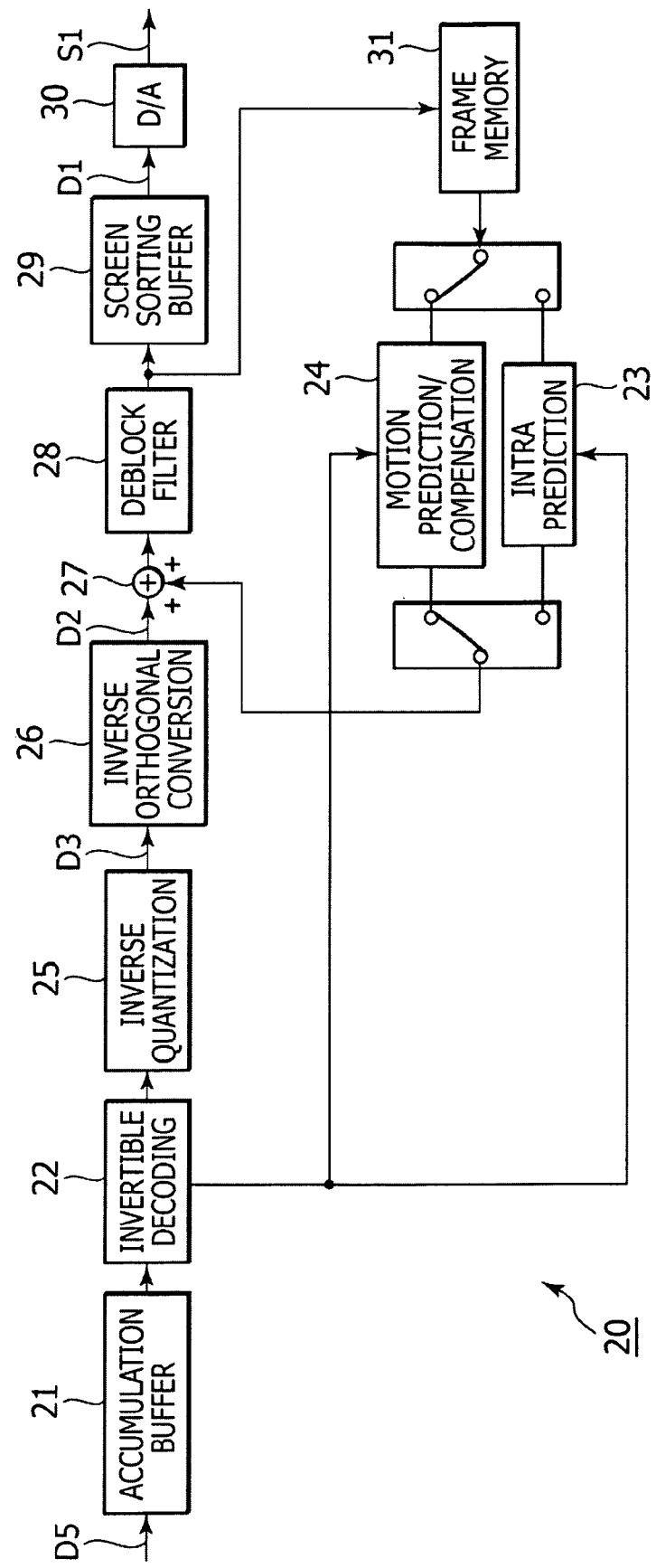
FIG. 6 is a block diagram showing a related-art decoder.
Figure 7:
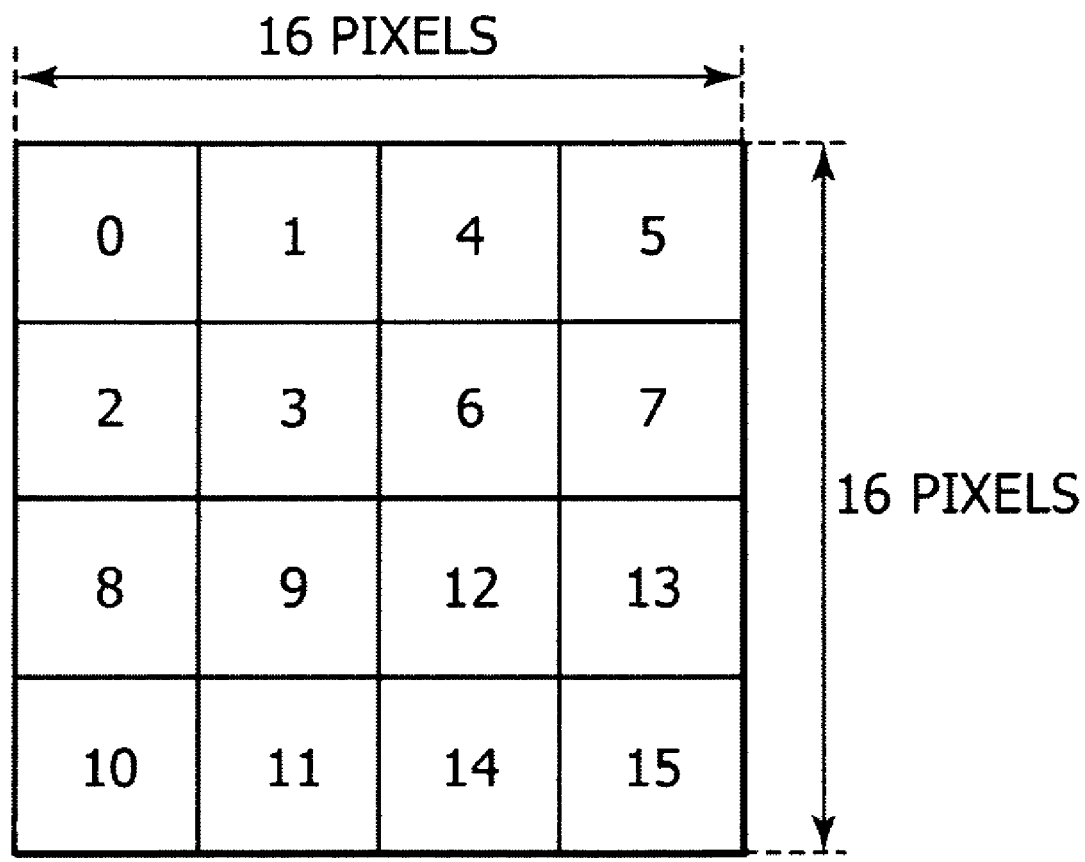
FIG. 7 is a schematic line drawing showing processing sequence of an intra 4×4 mode in a block of 16 pixels×16 pixels.
Figure 8:
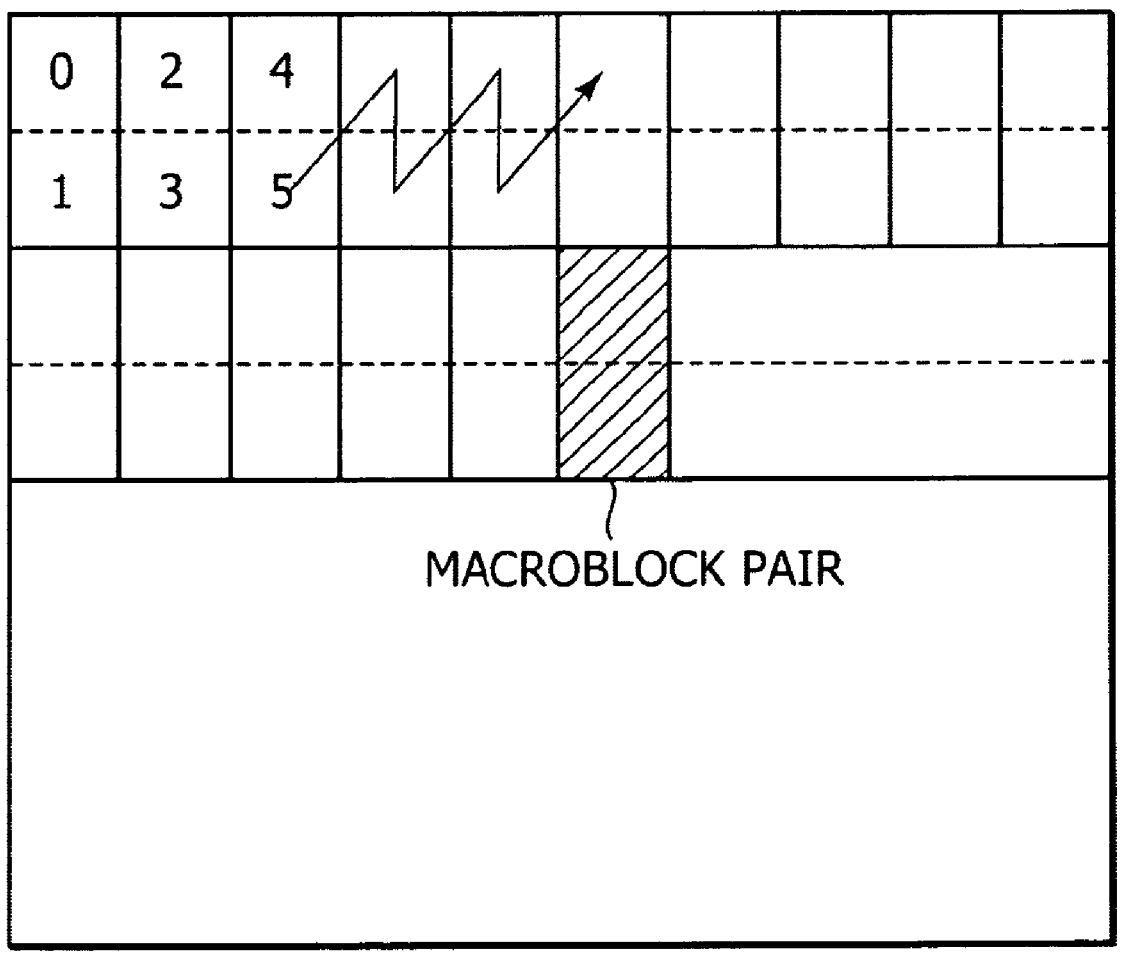
FIG. 8 is a schematic line drawing for illustrating processing of a macroblock pair.
Figure 11:
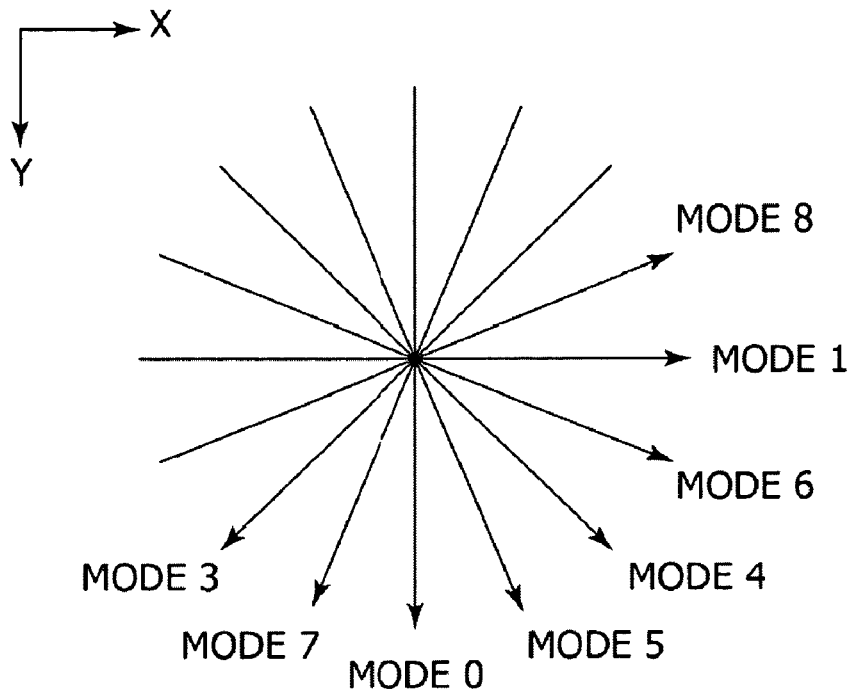
FIG. 11 is a schematic line drawing showing prediction directions of the intra 4×4 mode.
Figure 12:
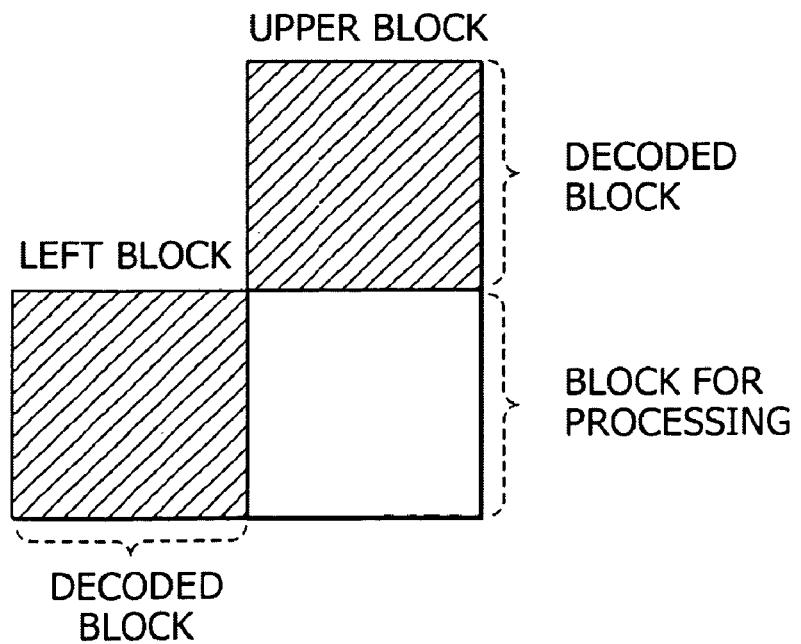
FIG. 12 is a schematic line drawing for illustrating prediction of a prediction direction from adjacent macroblocks.

Embodiments of the present invention will be described below in detail with reference to the drawings.
Embodiment 1
(1) Configuration of the Embodiment FIG. 2 is a block diagram showing an encoding apparatus of Embodiment 1 of the present invention by comparing with an encoding apparatus in FIG. 5. This encoding apparatus 41 is configured in the same manner as the encoding apparatus 1 except that an intra prediction circuit 42 and an intra prediction estimation circuit 43 are provided instead of the intra prediction circuit 5. This encoding apparatus 41 selects a best prediction mode by the intra prediction circuit 42 and the intra prediction estimation circuit 43, and generates prediction values for intra prediction.

The intra prediction circuit 42 calculates cost values of respective prediction modes in the intra 4×4 mode, and outputs the calculated cost values to the intra prediction estimation circuit 43 by a block unit corresponding to an intra 16×16 mode macroblock. Various cost value calculation methods may be applicable as long as they indicate occurring codes.

The intra prediction estimation circuit 43 calculates cost values for respective prediction modes in the intra 8×8 mode and the intra 16×16 mode by using the cost values for the respective prediction modes in the intra 4×4 mode outputted from this intra prediction circuit 42. Then, minimum values are detected from the calculated cost values, and best prediction modes in the intra 8×8 mode and the intra 16×16 mode are detected. The intra prediction estimation circuit 43 notifies the detected best prediction modes, along with their cost values to the intra prediction circuit 42.

The intra prediction circuit 42 detects best prediction modes in the intra 4×4 mode from the cost values for the respective prediction modes in the initially detected intra 4×4 mode. The intra prediction circuit 42 detects best prediction modes for intra prediction from the best prediction modes in the intra 4×4 mode, and the best prediction modes in the intra 8×8 mode and in the intra 16×16 mode notified from the intra prediction estimation circuit 43, calculates prediction values based on the best prediction modes for intra prediction, and outputs the calculated prediction values to a subtraction circuit 4. The detection of the best prediction mode for intra prediction is executed by, e.g., detection of a minimum cost value.

Figure 1:
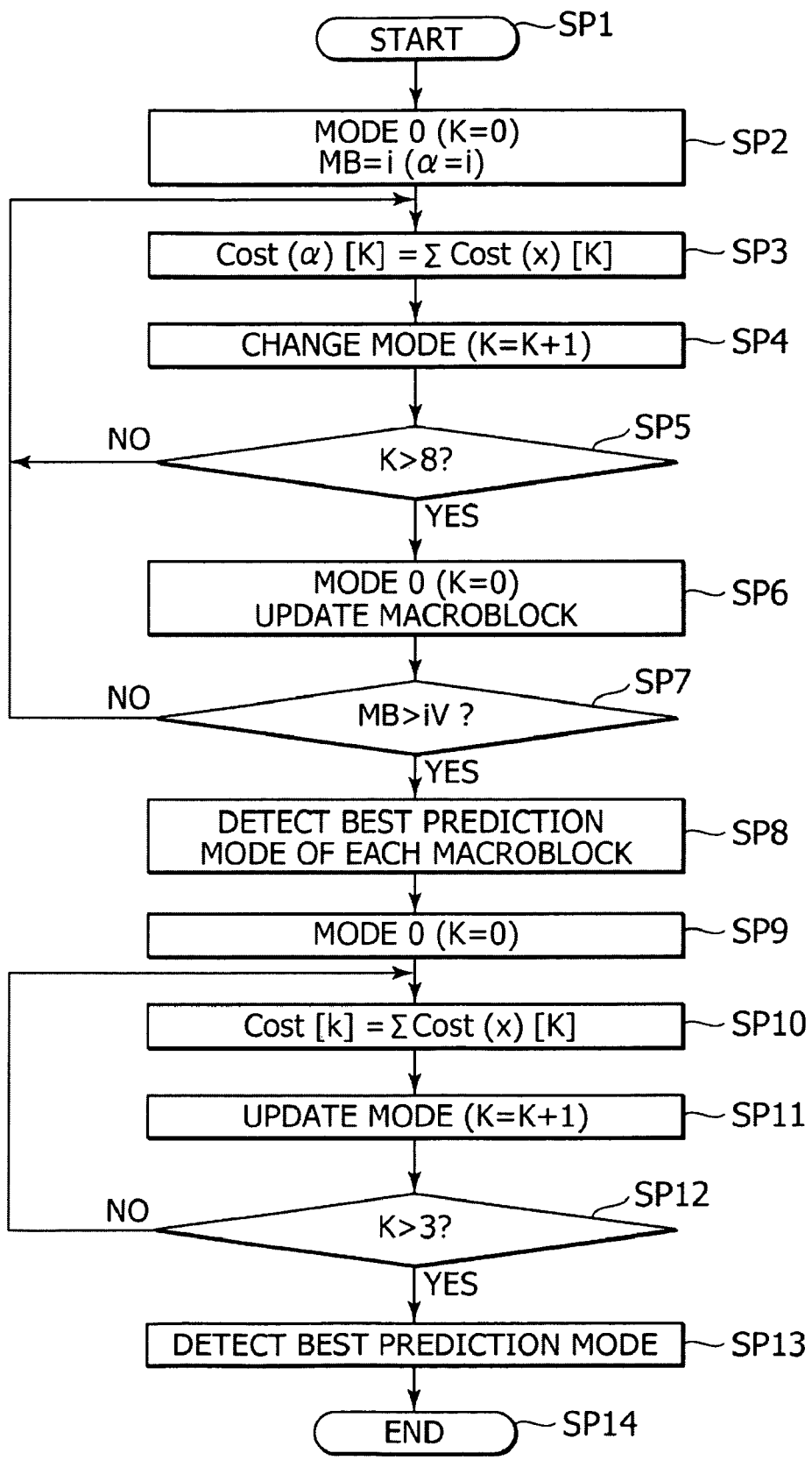
FIG. 1 is a flowchart showing a processing procedure of an intra prediction estimation circuit in an encoding apparatus according to Embodiment 1 of the present invention.

FIG. 1 is a flowchart showing a processing procedure in the intra prediction estimation circuit 43. The intra prediction estimation circuit 43 starts this processing procedure upon input of cost values for the respective prediction modes in the intra 4×4 mode, which correspond to amounts of a 16 pixel×16 pixel block, from the intra prediction circuit 42, and moves from step SP1 to step SP2.

A cost value for each prediction mode in the intra 4×4 mode is assumed to be Cost[x][k], where K is a variable indicating a prediction direction. In the intra 4×4 mode and the intra 8×8 mode, nine prediction directions of modes 0-8 are specified by this variable K, whereas in the intra 16×16 mode, four prediction directions of modes 0-3 are specified by this variable K. Furthermore, x is a variable specifying any of blocks indicated as 1-16 in FIG. 14A, and is a variable specifying each of intra 4×4 mode blocks in an intra 16×16 mode macroblock.

In this step SP2, the intra prediction estimation circuit 43 initializes variables α, k used for calculation of intra 8×8 mode cost values Cost[α][k]. Here, the variable α is a variable specifying sub macroblocks which are indicated as i-iv in FIG. 14B, and is a variable specifying each of intra 8×8 mode sub macroblocks in an intra 16×16 mode macroblock. Specifically, in an example of FIG. 1, the variable K is initialized to a variable indicating mode 0, and α is initialized to a variable indicating a starting sub macroblock i.

Then, in step SP3, the intra prediction estimation circuit 43 adds up cost values Cost(x)[K] in the intra 4×4 mode for the corresponding prediction direction and blocks by the computation processing of a formula below, with respect to the prediction mode in the intra 8×8 mode by the variable K, and calculate cost values Cost(α)[K].

[Formula 37]

$$\text{Cost}(\alpha)[K] = \sum \text{Cost}(x)[K] \qquad (37)$$

"x" on the right side of Formula (37) is indicated in a table of FIG. 14D. Accordingly, for mode 0 for the starting sub macroblock i in the intra 8×8 mode, the intra prediction estimation circuit 43 calculates cost values by adding up cost values "Cost" for the mode 0 of the blocks 1, 2, 5, 6 in the intra 4×4 mode, as indicated by the following formula.

[Formula 38]

$$\text{Cost}(i)[K]=\text{Cost}(1)[K]+\text{Cost}(2)[K]+\text{Cost}(5)[K]+\text{Cost}(6)[K] \qquad (38)$$

If there is a prediction direction u not usable by the JVT standard, cost values in the case are added up by setting the cost values Cost(x)[K] to a value by which this prediction direction mode is not selected, as indicated by, e.g., the following formula. Accordingly, in the following formula, although the cost value is set to be infinitive, various values having larger values compared with other cost values, such as a value overflowing during calculation and a value exceeding a maximum value of predicted cost value, may be applied alternatively.

[Formula 39]

$$\text{Cost}(N)[u]=\infty \qquad (39)$$

The intra prediction estimation circuit 43 then moves to step SP4, where it updates the variable K to change the prediction mode for which cost values are calculated. Further, in the subsequent step SP5, the circuit 43 judges whether cost values are calculated up to the last prediction mode, by judging the variable K. If negative result is obtained, the intra prediction estimation circuit 43 returns to step SP3 and calculate cost values for the subsequent prediction mode similarly. As a result, the intra prediction estimation circuit 43 repeats a processing procedures of steps SP3-SP4-SP5-SP3, and sequentially calculate cost values for the starting sub macroblock i in the intra 8×8 mode from mode 0 to mode 8. When cost values are calculated up to mode 8, positive result is obtained at step SP5, and the circuit 43 advances to step SP6.

In the step SP6, the intra prediction estimation circuit 43 initializes the variable K. Also, sub macroblock for cost value calculation is switched by update of the variable α. Then, the intra prediction estimation circuit 43 advances to step SP7, and judge whether cost values are calculated up to the last intra 8×8 mode sub macroblock iv, by judging the variable α. If negative result is obtained, the intra prediction estimation circuit 43 returns to step SP3 and calculates cost values for the subsequent sub macroblock.

Accordingly, in this case, the intra prediction estimation circuit 43 sequentially adds up cost values calculated in the intra 4×4 mode and calculates cost values for the respective prediction modes for each of the subsequent sub macroblocks ii, iii, iv, which is similar with calculation for the sub macroblock i. Furthermore, when cost values for the last sub macroblock iv are calculated, the circuit 43 moves from step SP7 to step SP8.

In the step SP8, the intra prediction estimation circuit 43 executes computation processing, based on the following formula, for each sub macroblock and detects a minimum cost value for each sub macroblock by use of the modes 0-8 cost values detected for each of the sub macroblocks i-iv. The circuit 43 further detects prediction directions d(α) for the detected minimum values.

[Formula 40]

$$d(\alpha)=\min(\text{Cost}(\alpha)[K]) \qquad (40)$$

By the processing of SP8, the intra prediction estimation circuit 43 detects a best prediction mode in the intra 8×8 mode for each sub macroblock. Then, the intra prediction estimation circuit 43 advances to step SP9, and initializes the variable K.

Further, in the subsequent step SP10, the circuit 43 executes computation processing based on the following formula, adds up cost values Cost(x)[K] in the intra 4×4 mode for the corresponding prediction direction and calculates a cost value Cost[K], with respect to the prediction mode in the intra 16×16 mode by the variable K.

[Formula 41]

$$\text{Cost}[K] = \sum \text{Cost}(x)[K] \quad (41)$$

Accordingly, for mode 0, the intra prediction estimation circuit 43 adds up the cost values "Cost" of mode 0 in the intra 4×4 mode blocks 1-16 to calculate the cost value. Then, in step SP11, the intra prediction estimation circuit 43 changes the mode for calculation by updates of the variable K. Further, in the subsequent step SP12, the circuit 43 judges whether cost values are calculated up to the last mode of the intra 16×16 mode by judging the variable k.

When negative result is obtained in step SP12, the intra prediction estimation circuit 43 returns to step SP10, and calculates a cost value for the subsequent mode 1. Further, upon calculation of the cost values for the model, the circuit 43 updates a mode for calculation in step SP11, thereafter returns from step SP12 to step SP10, and calculates a cost value for mode 2. Similarly, the circuit 43 calculates a cost value for mode 3.

In the JVT standard, a third prediction direction being mode 3 differs between the intra 16×16 mode and the intra 4×4 mode. Thus, the intra prediction estimation circuit 43 adds up intra 4×4 mode cost values having different prediction directions by averaging the cost values and calculates the cost value for mode 3 in the intra 16×16 mode. Specifically, for this mode 3 cost calculation, the intra prediction estimation circuit 43 adds up an average of cost values Cost(x)[3] (mode 3 cost values) for the third prediction direction and a cost values Cost(x)[8] (mode 8 cost values) for an eighth prediction direction, both being in the intra 4×4 mode, and calculates the cost value Cost[3] in the intra 16×16 mode, based on computation processing by utilizing the following formula.

[Formula 42]

$$\text{Cost}[3] = \sum \{(\text{Cost}(x)[3] + \text{Cost}(x)[8])/2\} \quad (42)$$

In the computation processing using this Formula (42), the intra prediction estimation circuit 43 utilizes processing results of highly relevant modes between the intra 16×16 mode and the intra 4×4 mode, and calculates the cost value Cost[3]for the prediction direction in the intra 16×16 mode which is not available in the intra 4×4 mode.

Upon calculation of the mode 3 cost value in step SP10, the intra prediction estimation circuit 43 moves from step SP12 to step SP13, because positive result is obtained in the subsequent step SP12.

The intra prediction estimation circuit 43 detects a minimum value from among the intra 16×16 mode cost values for modes 0-3 detected by repeating step SP10 and detects the best prediction mode in the intra 16×16 mode. The intra prediction estimation circuit 43 notifies the best prediction mode in the intra 16×16 mode detected in the step SP13 and the best prediction modes in the intra 8×8 mode detected in step SP8 to the intra prediction circuit 42, and then moves to step SP14 to end this processing procedure.

(2) Operation in the Embodiment

In the configuration (FIG. 2), a video signal S1 is converted into image data D1 by an analog-digital converter 2, sorted in a screen sorting buffer 3 based on a GOP structure. Then, prediction values of intra prediction and/or inter prediction respectively generated by an intra prediction circuit 5 and/or a motion prediction/compensation circuit 6 are subtracted in the subsequent subtraction circuit 4, and difference data D2 is hence generated. The video signal S1 has its difference data D2 subjected to orthogonal conversion processing by an orthogonal conversion circuit 7, has coefficient data obtained by the conversion processing subjected to quantization at a quantization circuit 8, thereafter has quantized data subjected to variable length encoding processing by an invertible encoding circuit 10, in order to generate an encoded data D5 (D4). The encoded data D5 is outputted to a transmission channel via a buffer 11. Also, the output data from the quantization circuit 8 is subjected to processing by an inverse quantization circuit 13 and an inverse orthogonal conversion circuit 14 in sequence in order to decode the original image data D1, and this image data D1 is stored in a frame memory 16 as reference image information.

During the series of encoding processing, in the encoding apparatus 41, a best prediction mode is selected from a plurality of intra prediction modes and a plurality of inter prediction modes, the difference data D2 is generated by subtracting prediction values by the selected prediction mode from the image data D1, and the image data D1 is efficiently compressed and transmitted.

However, in the processing of selecting a best prediction mode from a plurality of prediction modes, it has been required that cost values indicating amounts of occurring codes are calculated and minimum cost values are detected. Thus, enormous computation amounts were required for calculation of the cost values.

In the encoding apparatus 41, as to the intra 4×4 mode of the intra prediction modes, the intra prediction circuit 42 calculates cost values per each prediction mode similarly to the related-art case, and detects minimum cost values from the calculated cost values to detect best prediction modes.

On the other hand, as to the intra 8×8 mode and the intra 16×16 mode, the intra prediction estimation circuit 43 detects respective best prediction modes by utilizing the intra 4×4 mode processing in the intra prediction circuit 42. Further, the intra 8×8 mode and intra 16×16 mode best prediction modes detected by the intra prediction estimation circuit 43 and the intra 4×4 mode best prediction modes are judged by the intra prediction circuit 42 to detect a best prediction mode for intra prediction, and prediction values for intra prediction by the detected best prediction mode are generated.

As a result, in the encoding apparatus 41, the intra 4×4 mode processing is used for detecting the intra 8×8 mode and intra 16×16 mode best prediction modes. Accordingly, computational processing performed when the best prediction modes in the intra 8×8 mode and the intra 16×16 mode are detected, may be reduced compared to processings in the related art, and computational processings required for selection of the best prediction mode is reduced.

More specifically, in the intra prediction estimation circuit 43 of the encoding apparatus 41, cost values for the respective prediction modes obtained by the intra 4×4 mode are summed per each intra 8×8 mode prediction mode, whereby cost values for the respective prediction modes in the intra 8×8 mode are obtained. Similarly, the cost values for the respective prediction modes obtained by the intra 4×4 mode are summed per each intra 16×16 mode prediction mode, and cost values for the respective prediction modes in the intra 16×16 mode are obtained. Further, minimum values of the cost values are obtained at the intra 8×8 mode and the intra 16×16 mode, respectively, and then best prediction modes in the intra 8×8 mode and the intra 16×16 mode are obtained.

Accordingly, in the encoding apparatus 41, processing of calculating cost values in the intra 8×8 mode and the intra 16×16 mode may be performed with computational amounts, which are greatly small compared with amounts in the related art. As a result, computational processings required for selection of the best prediction mode can be reduced compared to a case in the related art.

As in this embodiment, when cost values in the intra 8×8 mode and the intra 16×16 mode are calculated by using cost values obtained in the intra 4×4 mode, accuracy may be lowered compared to a case where cost values are obtained by using Formulae (31), (32), and the like, due to differences in the positions of prediction source pixels and as to whether processing by the deblock filter is performed or not, and the like. However, in the intra 4×4 mode, intra 8×8 mode, and the like, since prediction directions and spatial positions of the original image are same, cost values can, in fact, be obtained with practically sufficient accuracy compared to a case where cost values are obtained by using Formulae (31), (32), and the like. Accordingly, in the encoding apparatus 41, the best prediction mode can be detected with practically sufficient accuracy, and encoding processing can be efficiently performed on the image data D1.

Further, for the intra 16×16 mode prediction direction not existing in the intra 4×4 mode, cost values are obtained by averaging cost values of two highly correlated modes and summing the values. As a result, even for the intra 16×16 mode prediction direction not existing in the intra 4×4 mode, the encoding apparatus 41 can detect the cost values and judge whether the values are in the best prediction mode by utilizing highly correlated processing results in the intra 4×4 mode.

(3) Effects of the Embodiment

According to the configuration, computational complexity required for selection of a best prediction mode can be reduced, when performing encoding processing by detecting a prediction mode suitable for intra prediction from best prediction modes detected per different prediction value generation units, in a case where the encoding processing is performed on image data by selecting a best prediction mode from a multitude of prediction modes, while detecting the best prediction modes based on the different prediction value generation units by utilizing one of best prediction mode detecting processing for the other best prediction mode detecting processing.

Further, by summing cost values detected on a small prediction value generation unit side and calculating cost values on a larger prediction value generation unit side, in a manner cost values of respective prediction modes are calculated and compared to detect a best prediction mode, computational complexity required for cost value calculation on the larger prediction value generation unit side is significantly reduced, and hence computational complexity required for selection of the best prediction mode can be reduced.

Further, by aggregating average values of cost values having different prediction directions, even with respect to cost values having a prediction direction not existing in one of the sides, computational complexity required for calculation can be significantly reduced, and hence cost values can be calculated with practically sufficient accuracy.

Further, in a case where a best prediction mode is selected from a plurality of prediction modes respectively available at the intra 4×4 mode, intra 8×8 mode, and intra 16×16 mode by calculating cost values of the intra 8×8 mode and the intra 16×16 mode while using cost values of the intra 4×4 mode, computational complexity required for selection of the prediction mode can be reduced.

Embodiment 2

In this embodiment, best prediction modes for the intra 4×4 mode and the intra 16×16 mode are detected by utilizing processing for detecting best prediction modes by the intra 8×8 mode, instead of detecting best prediction modes for the intra 8×8 mode and the intra 16×16 mode by utilizing processing for detecting best prediction modes by the intra 4×4 mode. More specifically, by using cost values calculated at the intra 8×8 mode, cost values for the intra 4×4 mode and the intra 16×16 mode are calculated. An encoding apparatus according to Embodiment 2 of the present invention is configured in the same way with the encoding apparatus 41 in Embodiment 1, except that processing required for the cost value calculation is different. Accordingly, a description is made below with reference to the configuration of FIG. 2.

In the encoding apparatus, the intra prediction circuit 42 calculates cost values of respective prediction modes in the intra 8×8 mode, and outputs the calculated cost values to the intra prediction estimation circuit 43 by a block unit corresponding to an intra 16×16 mode macroblock.

The intra prediction estimation circuit 43 calculates cost values of respective prediction modes in the intra 4×4 mode and the intra 16×16 mode by using the cost values of the respective prediction modes in the intra 8×8 mode outputted from the intra prediction circuit 42. Further, the circuit 43 detects minimum values from the calculated cost values and detects best prediction modes in the intra 4×4 mode and the intra 16×16 mode. The intra prediction estimation circuit 43 notifies the detected best prediction modes, together with the cost values to the intra prediction circuit 42.

The intra prediction circuit 42 detects best prediction modes in the intra 8×8 mode from the cost values for the respective prediction modes in the intra 8×8 mode detected first. The intra prediction circuit 42 detects best prediction mode to intra prediction from the best prediction modes in the intra 8×8 mode, and best prediction modes in the intra 4×4 mode and best prediction mode in the intra 16×16 mode notified from the intra prediction estimation circuit 43, calculates prediction values based on the best prediction mode of intra prediction, and outputs the values to the subtraction circuit 4.

Figure 3:
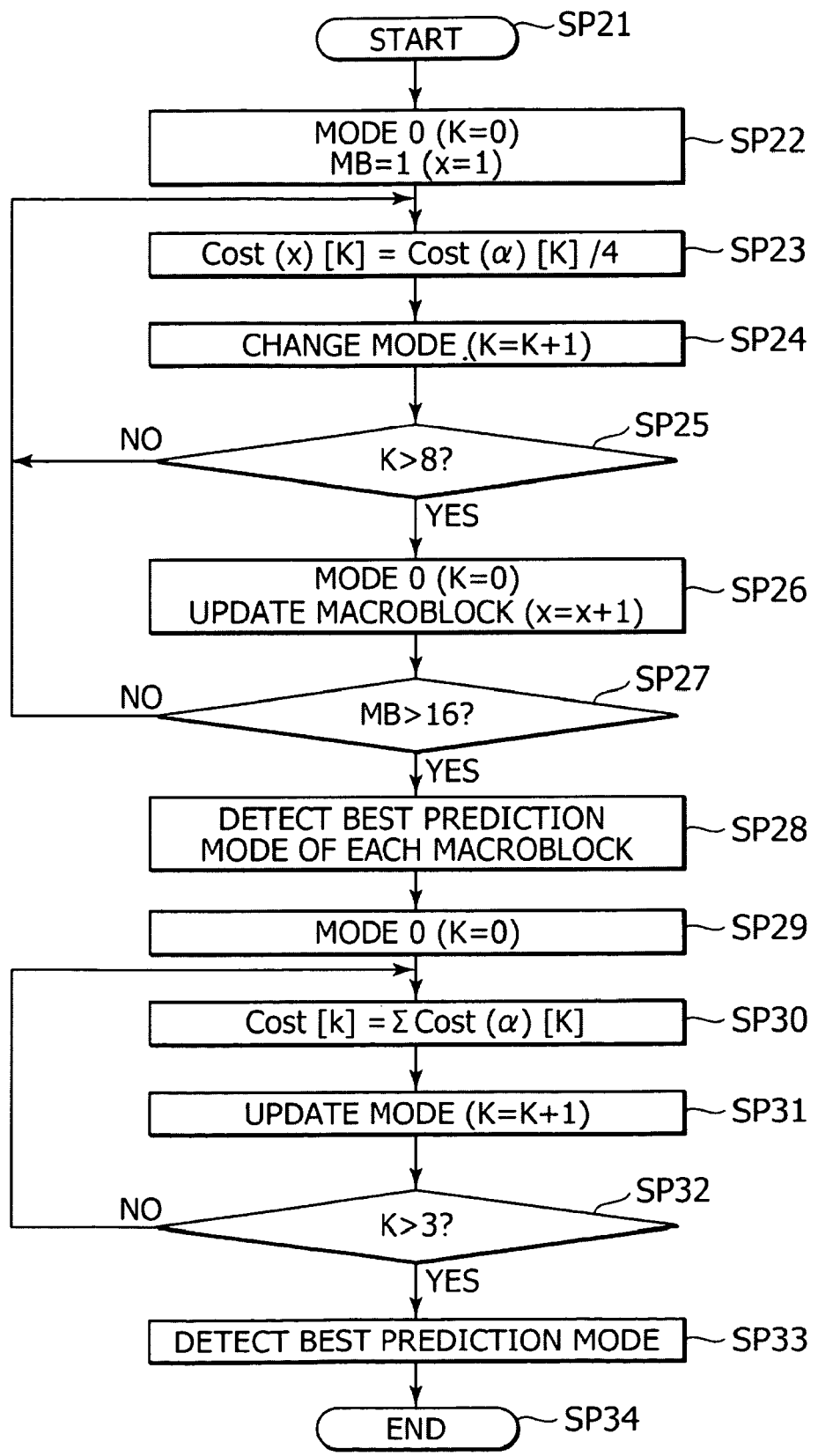
FIG. 3 is a flowchart showing a processing procedure of an intra prediction estimation circuit in an encoding apparatus according to Embodiment 2 of the present invention.

FIG. 3 is a flowchart showing a processing procedure in the intra prediction estimation circuit 43 by comparison with FIG. 1. The intra prediction estimation circuit 43 starts this processing procedure and moves from step SP21 to step SP22 when cost values of the respective prediction modes in the intra 8×8 mode corresponding to a 16 pixel×16 pixel block are inputted from the intra prediction circuit 42.

In step SP22, the intra prediction estimation circuit 43 initializes variables x, k to be used for calculation of cost values Cost[x][k] in the intra 4×4 mode. Specifically, in an example of FIG. 2, the variable K is initialized to a variable indicating mode 0, and x is initialized to a variable indicating a starting block 1 (see FIG. 14).

Then, in step SP23, the intra prediction estimation circuit 43 performs computation processing based on the following formula as to the prediction mode in the intra 4×4 mode by the variable K. A cost value Cost($\alpha$)[K] in the intra 8×8 mode of the corresponding prediction direction and sub macroblock is divided by the number of intra 4×4 mode blocks corresponding thereto to calculate a cost value Cost(x)[K].

[Formula 43]

$$\text{Cost}(x)[K] = \text{Cost}(\alpha)[K]/4 \qquad (43)$$

Noted, α on the right side of Formula (43) is indicated in the table of FIG. 14D. If there exist the prediction direction u not usable in the JVT standard, cost values are calculated by setting the cost value Cost(α)[K] to a value by which mode of the prediction direction is not selected, as similar with the Embodiment 1.

The intra prediction estimation circuit 43 then moves to step SP24, updates the variable K, and changes the prediction mode for which cost values are calculated. Further, in the subsequent step SP25, the circuit 43 judges the variable K to judge whether or not cost values are calculated up to the last prediction mode. If negative result is obtained, the intra prediction estimation circuit 43 returns to step SP23 to similarly calculate cost values for the subsequent prediction mode. As a result, the intra prediction estimation circuit 43 repeats a processing procedure of steps SP23-SP24-SP25-SP23 to sequentially calculate cost values from mode 0 to mode 8 for the starting block 1 in the intra 4×4 mode, and when cost values are calculated up to mode 8, positive result is obtained at step SP25, and the circuit 43 advances to step SP26.

In step SP26, the intra prediction estimation circuit 43 initializes the variable K. Also, the circuit 43 updates the variable x to switch to blocks for cost value calculation. Then, the intra prediction estimation circuit 43 advances to step SP27, and judges the variable x to judge whether or not cost values are calculated up to the last block 16 of the intra 4×4 prediction mode. If negative result is obtained, the intra prediction estimation circuit 43 returns to step SP23 to calculate cost values for the subsequent block.

Accordingly, in this case, the intra prediction estimation circuit 43 sequentially divides the cost values calculated at the intra 8×8 mode for the subsequent blocks 2, 3, . . . , as similar with the block 1, and calculates cost values for the respective prediction mode. Further, upon calculating a cost value for the last block 16, the intra prediction estimation circuit 43 moves from step SP27 to step SP28. Accordingly, to each of the intra 4×4 mode blocks 1, 2, 5, 6 corresponding to the starting sub macroblock i in the intra 8×8 mode, the intra prediction estimation circuit 43 sets a cost value, which is ¼ of the cost value Cost(i)[K] obtained at the starting intra 8×8 mode sub macro block i. Also, to each of the intra 4×4 mode blocks 3, 4, 7, 8 corresponding to the subsequent sub macroblock ii in the intra 8×8 mode, the intra prediction estimation circuit 43 sets a cost value, which is ¼ of the cost value Cost(ii)[K] obtained at the intra 8×8 mode sub macroblock ii.

In the step SP28, the intra prediction estimation circuit 43 detects a minimum cost value per each block, from the modes 0-8 cost values detected respectively at blocks 1 to 16. Also, the circuit 43 further detects prediction directions d(x) of the detected minimum values. As a result of the processings performed in step SP28, the intra prediction estimation circuit 43 detects a best prediction mode in the intra 4×4 mode per each block.

Then, the intra prediction estimation circuit 43 advances to step SP29, and initializes the variable K. Further, in the subsequent step SP30, the circuit 43 executes computation processing based on the following formula. Cost values Cost(α)[K] in the intra 8×8 mode for the corresponding prediction direction are added up to calculate a cost value Cost[K], with respect to the prediction mode in the intra 16×16 mode by the variable K.

[Formula 44]

$$\text{Cost}[K] = \sum \text{Cost}(\alpha)[K] \qquad (44)$$

Then, in step SP31, the intra prediction estimation circuit 43 updates the variable K to change the mode for calculation. Further, in the subsequent step SP32, the circuit 43 judges this variable K to judge whether cost values are calculated up to the last mode of the intra 16×16 mode.

If negative result is obtained in the step SP32, the intra prediction estimation circuit 43 returns to step SP30 to calculate a cost value of the subsequent mode 1. When the cost value of the mode 1 is calculated, the circuit 43 updates the mode for calculation in step SP31, and thereafter returns to step SP30 from step SP32 to calculate a cost value of mode 2. Similarly, the circuit 43 calculates a cost value of mode 3.

In this mode 3 cost calculation, the intra prediction estimation circuit 43 adds up an average values of cost values Cost(α)[3] (mode 3 cost values) by the third prediction direction and an cost values Cost(α)[8] (mode 8 cost values) by the eighth prediction direction, both in the intra 8×8 mode, and calculate the cost value Cost[3] based on the intra 16×16 mode, by computation processings based on the following formula.

[Formula 45]

$$\text{Cost}[3] = \sum \{(\text{Cost}(\alpha)[3] + \text{Cost}(\alpha)[8])/2\} \qquad (45)$$

By the computation processing using the Formula (45), the intra prediction estimation circuit 43 utilizes processing results of highly correlated modes between the intra 16×16 mode and the intra 8×8 mode to calculate the cost value Cost[3] of the prediction direction in the intra 16×16 mode which does not exist in the intra 8×8 mode.

The intra prediction estimation circuit 43 calculates the mode 3 cost value in step SP30, and in this case, positive result is obtained in the subsequent step SP32, whereby the circuit 43 moves from step SP32 to step SP33. The intra prediction estimation circuit 43 detects a minimum value from the intra 16×16 mode, cost values of modes 0 to 3 detected by repeating step SP30, to detect the best prediction mode in the intra 16×16 mode. The intra prediction estimation circuit 43 notifies the best prediction mode in the intra 16×16 mode detected in this step SP33 and the best prediction modes in the intra 4×4 mode detected in step SP28 to the intra prediction circuit 42, and then advances to step SP34 to end the processing procedures.

According to this embodiment, even if intra 16×16 mode cost values are calculated by using intra 8×8 mode cost values, effects similar to those in Embodiment 1 can be obtained.

Further, effects similar to those in Embodiment 1 can be obtained also if best prediction modes on a smaller prediction value generation unit side are detected by utilizing processing of a larger prediction value generation unit side to a smaller prediction value generation unit side.

Embodiment 3

In this embodiment, best prediction modes for the intra 4×4 mode and the intra 8×8 mode are detected by utilizing processing for detecting the best prediction mode by the intra 16×16 mode, instead of detecting best prediction modes for the intra 4×4 mode and the intra 16×16 mode by utilizing processing for detecting best prediction modes by the intra 8×8 mode. More specifically, by using cost values calculated at the intra 16×16 mode, cost values of the intra 4×4 mode and the intra 8×8 mode are calculated. An encoding apparatus according to Embodiment of the present invention is configured in the same way as the encoding apparatus 41 according to Embodiment 1 except that processing required for this cost value calculation is different. Accordingly, a description is made below with reference to the configuration of FIG. 2.

In the encoding apparatus, the intra prediction circuit 42 calculates cost values for the respective prediction modes in the intra 16×16 mode, and outputs the calculated cost values to the intra prediction estimation circuit 43.

The intra prediction estimation circuit 43 calculates cost values of corresponding prediction directions in the intra 4×4 mode and the intra 8×8 mode by using the cost values of the respective prediction modes in the intra 16×16 mode outputted from this intra prediction circuit 42. Further, the circuit 43 detects minimum values from the calculated cost values to detect best prediction modes in the intra 4×4 mode and the intra 8×8 mode, respectively. The intra prediction estimation circuit 43 notifies the detected best prediction modes, together with cost values to the intra prediction circuit 42.

The intra prediction circuit 42 detects the best prediction mode in the intra 16×16 mode from the cost values of the respective prediction mode in the intra 16×16 mode detected first. The intra prediction circuit 42 detects best prediction modes for intra prediction from the best prediction mode in the intra 16×16 mode, and best prediction modes in the intra 4×4 mode and best prediction modes in the intra 8×8 mode notified from the intra prediction estimation circuit 43, calculates prediction values based on the best prediction modes of intra prediction, and outputs the values to the subtraction circuit 4.

Figure 4:
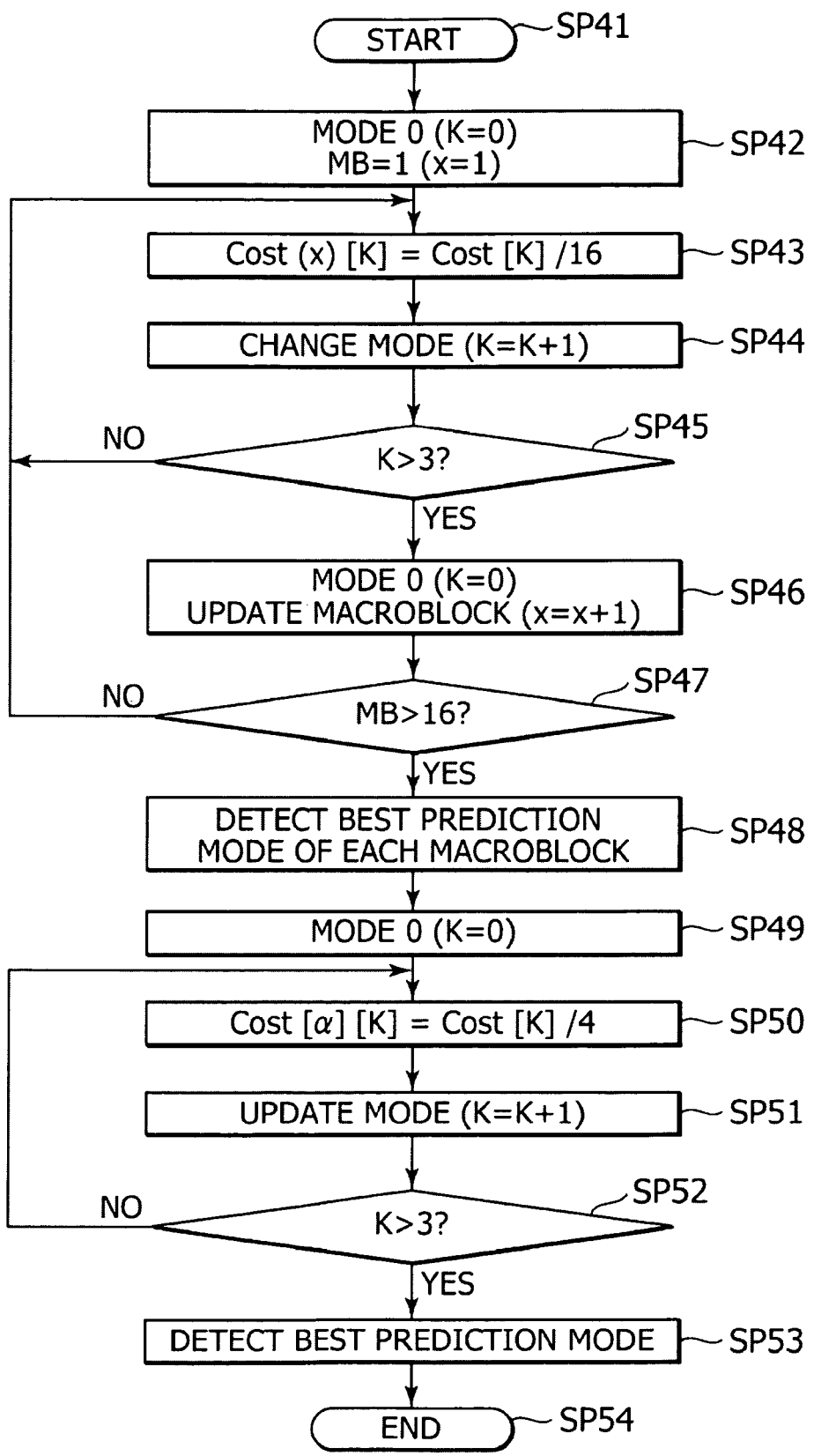
FIG. 4 is a flowchart showing a processing procedure of an intra prediction estimation circuit in an encoding apparatus according to Embodiment 3 of the present invention.

FIG. 4 is a flowchart showing a processing procedure in this intra prediction estimation circuit 43 by comparison with FIG. 1. The intra prediction estimation circuit 43 starts this processing procedure upon input of the cost values of the respective prediction modes in the intra 16×16 mode from the intra prediction circuit 42, and moves from step SP41 to step SP42.

In this step SP42, the intra prediction estimation circuit 43 initializes variables x, k to be used for calculation of cost values Cost[x][k] in the intra 4×4 mode. Specifically, the variable K is initialized to a variable indicating mode 0, and x is initialized to a variable indicating the starting block 1 (see FIG. 14).

Then, in step SP43, the intra prediction estimation circuit 43 performs computation processing based on the following formula. The cost value Cost[K] of the corresponding prediction direction is divided by the number of intra 4×4 mode blocks corresponding thereto to calculate a cost value Cost (x)[K], with respect to the prediction mode in the intra 4×4 mode by the variable K.

[Formula 46]

$$\text{Cost}(x)[K] = \text{Cost}[K]/16 \quad (46)$$

If there exist the prediction direction u not usable by the JVT standard, the cost values are calculated by setting the cost value Cost[K] to a value by which a mode of this prediction direction is not selected, similarly to Embodiment 1.

The intra prediction estimation circuit 43 then advances to step SP44, updates the variable K, and changes the prediction mode for which cost values are calculated. Further, in step SP45, the circuit 43 judges the variable K to judge whether cost values are calculated up to the last prediction mode of the intra 16×16 mode. If negative result is obtained, the intra prediction estimation circuit 43 returns to step SP43 to simi-larly calculate a cost value for the subsequent prediction mode. As a result, the intra prediction estimation circuit 43 repeats a processing procedures of steps SP43-SP44-SP45-SP43 to sequentially calculate cost values from mode 0 to mode 3 for the starting block 1 in the intra 4×4 mode, and when cost values are calculated up to mode 3, positive result is obtained in step SP45, and the circuit 43 advances to step SP46.

In this step SP46, the intra prediction estimation circuit 43 initializes the variable K. Also, the circuit 43 updates the variable x to switch blocks for cost value calculation. Then, the intra prediction estimation circuit 43 advances to step SP47, and judges the variable x to judge whether cost values are calculated up to the last block 16 in the intra 4×4 mode. If negative result is obtained, the intra prediction estimation circuit 43 returns to step SP43 to calculate cost values of the subsequent block.

Accordingly, in this case, the intra prediction estimation circuit 43 repeats processings of step SP43, and divide cost values of mode 0 to 3 of the intra 16×16 mode by the number of intra 4×4 mode blocks contained in a single intra 16×16 mode macroblock, to calculate cost values of mode 0 to 3 of intra 4×4 mode. Further, when cost values of the last block 16 are calculated, the circuit 43 moves from step SP47 to step SP48.

In this step SP48, the intra prediction estimation circuit 43 detects a minimum cost value per each block, from cost values of the modes 0 to 3 detected respectively at the blocks 1 to 16. Also, the circuit 43 detects prediction directions d(x) of the detected minimum values. As a result of processings of the step SP48, the intra prediction estimation circuit 43 detects a best prediction mode in the intra 4×4 mode per each block.

Then, the intra prediction estimation circuit 43 advances to step SP49, and initializes the variable K. Further, in the subsequent step SP50, the circuit 43 divides cost values of mode 0 of the intra 16×16 mode by the number of sub macroblocks of intra 8×8 mode contained in a single intra 16×16 macroblock, to calculate cost values of mode 0 of intra 8×8 mode.

Then, in step SP51, the intra prediction estimation circuit 43 updates the variable K to change the mode for calculation. Further, in the subsequent step SP52, the circuit 43 judges the variable K to judge whether cost values are calculated up to the last mode of the intra 16×16 mode.

If negative result is obtained in step SP52, the intra prediction estimation circuit 43 returns to step SP50 to calculate cost values of the subsequent mode 1. When processings of step SP50 are repeated up to the last mode of the intra 16×16 mode, positive result is obtained in step SP52, and the intra prediction estimation circuit 43 moves from step SP52 to step SP53.

Further, in step SP53, the circuit 43 detects best prediction modes of the intra 8×8 mode, and notifies the best prediction modes in the intra 8×8 mode, and best prediction modes in the intra 4×4 mode detected in step SP48 to the intra prediction circuit 42, and then moves to step SP54 to end this processing procedure.

In the JVT standard, the mode 3 prediction direction in the intra 8×8 mode and the intra 4×4 mode is different from the mode 3 prediction direction in the intra 16×16 mode. Accordingly, as indicated by the following formula, cost values for the different direction may be calculated from the mode 3 cost value in the intra 16×16 mode by assigning the prediction direction of the mode 3 in the intra 16×16 mode, in addition to prediction directions of mode 3 in the intra 8×8 mode and the intra 4×4 mode to cost values of mode 8 respectively.

[Formula 47]

$$\text{Cost}(x)[8] = \text{Cost}[3]$$

$$\text{Cost}(\alpha)[8] = \text{Cost}[3] \quad (47)$$

Even if cost values of the intra 8×8 mode and the intra 4×4 mode are calculated by using cost values in the intra 16×16 mode as in this embodiment, effects similar to those in Embodiment 1 can be obtained.

Embodiment 4

Meanwhile, in Embodiment 1 described above, when intra 8×8 mode best prediction modes are detected by calculating intra 8×8 mode cost values from intra 4×4 mode cost values, if, e.g., mode 0 is the best prediction mode in all four intra 4×4 mode blocks contained in a single intra 8×8 mode sub macroblock, mode 0 is the best prediction mode even in the intra 8×8 mode, and detection of intra 8×8 mode cost values is not required.

Further, if, mode 0 is the best prediction mode in three out of the four intra 4×4 mode blocks contained in the single intra 8×8 mode sub macroblock, it is highly possible that mode becomes the best prediction mode even for the intra 8×8 mode.

Further, if, e.g., mode 0 is the best prediction mode in two out of the four intra 4×4 mode blocks contained in the single intra 8×8 mode sub macroblock and if, e.g., mode 1 and mode 3 are best prediction modes in the remaining two blocks, it is highly possible that mode 0 becomes the best prediction mode even in the intra 8×8 mode.

Accordingly, in this embodiment, best prediction modes detected at a smaller prediction value generation unit side are summed, and the best prediction mode on the smaller prediction value generation unit side is detected based on a so-called majority rule. Further, if the best prediction mode having summed values not less than a predetermined value can not be detected, the best prediction mode is detected by cost value calculation similar to that in Embodiment 1 or Embodiment 2 described above.

According to this embodiment, the best prediction modes detected on the smaller prediction value generation unit side are summed, and the best prediction mode in a smaller prediction value generation unit side by is detected based on the so-called majority rule, whereby computational complexity can be further reduced.

Embodiment 5

Meanwhile, in Embodiment 3 described above, in a case where intra 8×8 mode best prediction modes are detected by calculating intra 8×8 mode cost values from intra 16×16 mode cost values, and if the intra 16×16 mode best prediction mode is mode 0, mode 0 which is the same with the best prediction mode in the intra 16×16 mode becomes the best prediction mode in four intra 8×8 mode sub macroblocks contained in a single intra 16×16 mode macroblock.

Thus, in this embodiment, the best prediction mode detected in a large prediction value generation unit side is assigned to the best prediction mode in a small prediction value generation unit side.

According to this embodiment, by assigning the best prediction mode detected at a large prediction value generation unit side to the best prediction mode at a small prediction value generation unit side, computational complexity can be further reduced.

Embodiment 6

In the above-described embodiments, descriptions have been made for cases when cost values or best prediction modes calculated in one out of the intra 16×16 mode, intra 8×8 mode, and intra 4×4 mode are used to detect cost values or best prediction modes of the remaining two modes. However, the present invention is not limited to the cases. It may also be configured such that cost values or best prediction modes are obtained by two modes out of the three modes, and cost values or best prediction modes of the remaining one mode may be obtained from the cost values or best prediction modes.

Further, in the above-described embodiments, cases where the present invention is applied to encoding apparatuses configured by hardware have been described. However, the present invention is not limited to the cases, but widely applicable to encoding apparatuses configured by software based on computation processing by a computer or the like. In this case, a program may be provided by being recorded on a recording medium, such as an optical disc, a magnetic disc, or a memory card, and may also be provided via a network, such as the Internet.

Further, in the above-described embodiments, cases where the present invention is applied when encoding processing compliant with the JVT encoding schemes is performed, have been described. However, the present invention is not limited to the cases, but widely applicable to various encoding processing for intra prediction at prediction value generation units of different block sizes.

The present invention relates to an encoding apparatus, an encoding method, a program for the encoding method, and a recording medium having the program for the encoding method recorded thereon, and is applicable to encoding apparatuses compliant with, e.g., H.264 and MPEG-4 Part 10.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-184286 filed in the Japanese Patent Office on Jul. 13, 2007, the entire content of which being incorporated herein by reference.

What is claimed is:

1. An encoding apparatus for generating, in an intra prediction mode, difference data by subtracting prediction values from input image data, and performing encoding processing on the input image data by processing the difference data, the apparatus comprising:

a first prediction mode detecting unit configured to identify a first prediction mode from a plurality of candidate first prediction modes, based on at least first cost values associated with the candidate first prediction modes, the first prediction mode being suitable for the encoding processing in a first prediction value generation unit;

a second prediction mode detecting unit configured to detect a second prediction mode from a plurality of candidate second prediction modes, based on at least second cost values associated with the candidate second prediction modes, the second prediction mode being suitable for encoding processing in a second prediction value generation unit; and a prediction value generating unit configured to:
select one of the first or second prediction modes as a prediction mode of the encoding processing; and
generate the prediction value based on the selected prediction mode,
wherein:
the first prediction mode detecting unit is further configured to identify the first prediction mode by utilizing processing in the second prediction mode detecting unit;

the apparatus further comprises a first cost value calculating unit, the first cost value calculating unit being configured to calculate the first cost values, and the first cost values being indicative of an amount of occurring codes for the candidate first prediction modes; and the first cost value calculating unit is further configured to calculate the first cost values by aggregating averages of the second cost values corresponding to one or more prediction directions of the candidate second prediction modes that fail to be associated with the candidate first prediction modes.

2. The encoding apparatus of claim 1, wherein the first prediction mode detecting unit is further configured to identify the first prediction mode based on a comparison of the first cost values associated with the candidate first prediction modes the apparatus further comprises a second cost value calculating unit, the second cost value calculating unit being configured to calculate the second cost values, and the second cost values being indicative of an amount of occurring codes for the candidate second prediction modes:

the second prediction mode detecting unit is further configured to identify the second prediction mode based on a comparison of the second cost values associated with the candidate second prediction modes.

3. The encoding apparatus of claim 1, wherein:

the first prediction mode detecting is further configured to identify the first prediction mode by aggregating corresponding ones of the candidate second prediction modes in the second prediction value generation unit.

4. The encoding apparatus of claim 1, wherein:

the first prediction mode is a prediction mode in an intra 16×16 mode, and the second prediction mode is a prediction mode in an intra 4×4 mode or a prediction mode in an intra 8×8 mode.

5. The encoding apparatus of claim 1, wherein:

the first prediction mode is a prediction mode in an intra 8×8 mode, and the second prediction mode is a prediction mode in an intra 4×4 mode.

6. An encoding apparatus for generating, in an intra prediction mode, difference data by subtracting prediction values from input image data, and performing encoding processing on the input image data by processing the difference data, comprising:

a first prediction mode detecting unit configured to identify a first prediction mode from a plurality of candidate first prediction modes, based on at least first cost values associated with the candidate first prediction modes, the first prediction mode being suitable for the encoding processing in a first prediction value generation unit;

a second prediction mode detecting unit configured to detect a second prediction mode from a plurality of candidate second prediction modes, based on at least second cost values associated with the candidate second prediction modes, the second prediction mode being suitable for encoding processing in a second prediction value generation unit; and a prediction value generating unit configured to:

select one of the first or second prediction modes as a prediction mode of the encoding processing; and generate the prediction values based on the selected prediction mode wherein:

the second prediction mode detecting unit is further configured to identify the second prediction mode by utilizing processing in the first prediction mode detecting unit;

the apparatus further comprises a second cost value calculating unit configured to calculate the second cost values, the second cost values being indicative of an amount of occurring codes for the candidate second prediction modes; and the second cost value calculating unit is further configured to calculate the second cost values by assigning at least one of the first cost values to a corresponding one of the candidate second prediction modes, the corresponding candidate second prediction mode being associated with a prediction direction that fails to be associated with the candidate first prediction modes.

7. The encoding apparatus of claim 6, wherein the apparatus further comprises a first cost value calculating unit configured to calculate first cost values indicative of an amount of occurring codes for the candidate first prediction modes;

the first prediction mode detection unit is further configured to identify the first prediction mode by comparison of the first cost values calculated by the first cost value calculating unit; and the second prediction mode detecting unit is further configured to identify the second prediction mode by comparison of the second cost values calculated by the second cost value calculating unit.

8. The encoding apparatus of claim 6, wherein:

the second prediction mode detecting is further configured to identify candidate second prediction modes in the second prediction value generation unit corresponding to the first prediction mode.

9. The encoding apparatus of claim 6, wherein:

the first prediction mode is a prediction mode in an intra 8×8 mode or a prediction mode in an intra 16×16 mode, and the second prediction mode is a prediction mode in an intra 4×4 mode.

10. The encoding apparatus of claim 6, wherein:

the first prediction mode is a prediction mode in an intra 16×16 mode, and the second prediction mode is a prediction mode in an intra 8×8 mode.

11. An encoding method for generating, in an intra prediction mode, difference data by subtracting prediction values from input image data, and performing encoding processing on the input image data by processing the difference data, comprising:

identifying a first prediction mode from a plurality of candidate first prediction modes, based on at least first cost values associated with the candidate first prediction modes, the first prediction mode being suitable for the encoding processing in a first prediction value generation unit;

identifying a second prediction mode from a plurality of candidate second prediction modes, based on at least second cost values associated with the candidate second prediction modes, the second prediction mode being suitable for encoding processing in a second prediction value generation unit;

selecting one of the first or second prediction modes as a prediction mode of the encoding processing; and generating the prediction values on the basis of the selected prediction mode of the encoding processing, wherein identifying the first prediction mode comprises:

calculating the first cost values, the first cost values being indicative of an amount of occurring codes for the candidate first prediction modes, the calculating comprising aggregating averages of the second cost values corresponding to one or more prediction directions of the candidate second prediction modes that fail to be associated with the candidate first prediction modes; and identifying the first prediction mode based on a comparison of the first cost values associated with the candidate first prediction modes.

12. An encoding method for generating, in an intra prediction mode, difference data by subtracting prediction values from input image data, and performing encoding processing on the input image data by processing the difference data, comprising:

identifying a first prediction mode from a plurality of candidate first prediction modes, based on at least first cost values associated with the candidate first prediction modes, the first prediction mode being suitable for the encoding processing in a first prediction value generation unit;

identifying a second prediction mode from a plurality of candidate second prediction modes, based on at least second cost values associated with the candidate second prediction modes, the second prediction mode being suitable for encoding processing in a second prediction value generation unit;

selecting one of the first or second prediction modes as a prediction mode of the encoding processing; and generating the prediction values on the basis of the selected prediction mode, wherein:

identifying the second prediction mode comprises calculating the second cost values, the second cost values being indicative of an amount of occurring codes for the candidate second prediction modes; and the calculating comprises assigning at least one of the first cost values to a corresponding one of the candidate second prediction modes, the corresponding candidate second prediction mode being associated with at least one prediction direction that fails to be associated with the candidate first prediction modes.

13. A tangible, non-transitory computer readable medium storing instruction that, when executed by at least one processor, cause the at least one processor to perform an encoding method for generating, in an intra prediction mode, difference data by subtracting prediction values from input image data, and performing encoding processing on the input image data by processing the difference data, the method comprising:

identifying a first prediction mode from a plurality of candidate first prediction modes, based on at least first cost values associated with the candidate first prediction modes, the first prediction mode being suitable for the encoding processing in a first prediction value generation unit;

identifying a second prediction mode from a plurality of candidate second prediction modes, based on at least second cost values associated with the candidate second prediction modes, the second prediction mode being suitable for encoding processing in a second prediction value generation unit;

selecting one of the first or second prediction modes as a prediction mode of the encoding processing; and generating the prediction values on the basis of the selected prediction mode of the encoding processing, wherein identifying the first prediction mode comprises:

calculating the first cost values, the first cost values being indicative of an amount of occurring codes for the candidate first prediction modes, the calculating comprising aggregating averages of the second cost values corresponding to one or more prediction directions of the candidate second prediction modes that fail to be associated with the candidate first prediction modes; and identifying the first prediction mode based on a comparison of the first cost values associated with the candidate first prediction modes.

14. A tangible, non-transitory computer readable medium storing instruction that, when executed by at least one processor, cause the at least one processor to perform an encoding method for generating, in an intra prediction mode, difference data by subtracting prediction values from input image data, and performing encoding processing on the input image data by processing the difference data, the method comprising:

identifying a first prediction mode from a plurality of candidate first prediction modes, based on at least first cost values associated with the candidate first prediction modes, the first prediction mode being suitable for the encoding processing in a first prediction value generation unit;

identifying a second prediction mode from a plurality of candidate second prediction modes, based on at least second cost values associated with the candidate second prediction modes, the second prediction mode being suitable for encoding processing in a second prediction value generation unit;

selecting one of the first or second prediction modes as a prediction mode of the encoding processing; and generating the prediction values on the basis of the selected prediction mode, wherein:

identifying the second prediction mode comprises calculating the second cost values, the second cost values being indicative of an amount of occurring codes for the candidate second prediction modes; and the calculating comprises assigning at least one of the first cost values to a corresponding one of the candidate second prediction modes, the corresponding candidate second prediction mode being associated with at least one prediction direction that fails to be associated with the candidate first prediction modes.

15. An apparatus for generating, in an intra prediction mode, difference data by subtracting prediction values from input image data, and performing encoding processing on the input image data by processing the difference data, the apparatus comprising:

a storage device; and at least one processor coupled to the storage device, wherein the storage device stores a program for controlling the at least one processor, and wherein the at least one processor, being operative with the program, is configured to:

identifying a first prediction mode from a plurality of candidate first prediction modes, based on at least first cost values associated with the candidate first prediction modes, the first prediction mode being suitable for the encoding processing in a first prediction value generation unit;

identifying a second prediction mode from a plurality of candidate second prediction modes, based on at least second cost values associated with the candidate second prediction modes, the second prediction mode being suitable for encoding processing in a second prediction value generation unit;

selecting one of the first or second prediction modes as a prediction mode of the encoding processing; and generating the prediction values on the basis of the selected prediction mode of the encoding processing, wherein identifying the first prediction mode comprises:
calculating the first cost values, the first cost values being indicative of an amount of occurring codes for the candidate first prediction modes, the calculating comprising aggregating averages of the second cost values corresponding to one or more prediction directions of the candidate second prediction modes that fail to be associated with the candidate first prediction modes; and identifying the first prediction mode based on a comparison of the first cost values associated with the candidate first prediction modes.

16. An apparatus for generating, in an intra prediction mode, difference data by subtracting prediction values from input image data, and performing encoding processing on the input image data by processing the difference data, the apparatus comprising:

a storage device; and at least one processor coupled to the storage device, wherein the storage device stores a program for controlling the at least one processor, and wherein the at least one processor, being operative with the program, is configured to:

identifying a first prediction mode from a plurality of candidate first prediction modes, based on at least first cost values associated with the candidate first prediction modes, the first prediction mode being suitable for the encoding processing in a first prediction value generation unit;

identifying a second prediction mode from a plurality of candidate second prediction modes, based on at least second cost values associated with the candidate second prediction modes, the second prediction mode being suitable for encoding processing in a second prediction value generation unit;

selecting one of the first or second prediction modes as a prediction mode of the encoding processing; and generating the prediction values on the basis of the best selected prediction mode, wherein:
identifying the second prediction mode comprises calculating the second cost values, the second cost values being indicative of an amount of occurring codes for the candidate second prediction modes; and the calculating comprises assigning at least one of the first cost values to a corresponding one of the candidate second prediction modes, the corresponding candidate second prediction mode being associated with at least one prediction direction that fails to be associated with the candidate first prediction modes.

* * * * *